US009684916B2

(12) United States Patent
Walker et al.

(10) Patent No.: US 9,684,916 B2
(45) Date of Patent: Jun. 20, 2017

(54) RETAIL SYSTEM FOR SELLING PRODUCTS BASED ON A FLEXIBLE PRODUCT DESCRIPTION

(71) Applicant: Groupon, Inc., Chicago, IL (US)

(72) Inventors: Jay S. Walker, Ridgefield, CT (US); Peter Kim, Stamford, CT (US); James A. Jorasch, Stamford, CT (US); Magdalena Mik Fincham, Greenwich, CT (US); Daniel E Tedesco, Westport, CT (US); Russell Pratt Sammon, Stamford, CT (US); Andrew P. Golden, New York, NY (US); Raymond J. Mueller, Weston, CT (US); Keith Bemer, New York, NY (US); Kathleen Van Luchene, Norwalk, CT (US)

(73) Assignee: Groupon, Inc., Chicago, IL (US)

( * ) Notice: Subject to any disclaimer, the term of this patent is extended or adjusted under 35 U.S.C. 154(b) by 0 days.

(21) Appl. No.: 14/315,026

(22) Filed: Jun. 25, 2014

(65) Prior Publication Data

US 2015/0012343 A1 Jan. 8, 2015

Related U.S. Application Data

(60) Continuation of application No. 13/619,579, filed on Sep. 14, 2012, now Pat. No. 8,799,100, which is a
(Continued)

(51) Int. Cl.
*G06Q 20/00* (2012.01)
*G06Q 30/06* (2012.01)
(Continued)

(52) U.S. Cl.
CPC ....... *G06Q 30/0613* (2013.01); *G06Q 20/204* (2013.01); *G06Q 30/0208* (2013.01);
(Continued)

(58) Field of Classification Search
CPC ........ G06Q 10/00; G06Q 20/00; G06Q 30/00; G06Q 40/00
(Continued)

(56) References Cited

U.S. PATENT DOCUMENTS 3,573,747 A  4/1971  Adams
3,691,527 A  9/1972  Yamamoto
(Continued)

FOREIGN PATENT DOCUMENTS

CA  2070736 A1  12/1992
CA  2217739 A1  10/1996
(Continued)

OTHER PUBLICATIONS

Maras, Elliot, "1995: downsizing adds costs; new strategies sought", Automatic Merchandiser, Aug. 1996, pp. 20-22; 24, 26, 28, 30, 32, 34, 36, 38, 40 and 44, 13 pp.
(Continued)

*Primary Examiner* — Frantzy Poinvil
(74) *Attorney, Agent, or Firm* — Alston & Bird LLP

(57) ABSTRACT

According to one described embodiment, a method is provided in which transaction information is determined. The transaction information is associated with (i) a buyer who has arranged to purchase a product from a central controller at a first price established between the buyer and the central controller and (ii) a merchant that offers the product for sale at a second price, different from the first price, without offering the product for sale to buyers at the first price. Information is transmitted that facilitates the acquisition of the product by the buyer, in exchange for payment provided
(Continued)

by the buyer to the central controller. An amount based on the second price is provided to the merchant.

20 Claims, 27 Drawing Sheets

Related U.S. Application Data continuation of application No. 13/437,706, filed on Apr. 2, 2012, now abandoned, which is a continuation of application No. 11/746,714, filed on May 10, 2007, now Pat. No. 8,150,735, which is a division of application No. 09/540,035, filed on Mar. 31, 2000, now Pat. No. 7,711,604, which is a continuation-in-part of application No. 09/388,723, filed on Sep. 2, 1999, now abandoned, and a continuation-in-part of application No. 09/359,265, filed on Jul. 22, 1999, now abandoned, and a continuation-in-part of application No. 09/337,906, filed on Jun. 22, 1999, now Pat. No. 6,754,636, and a continuation-in-part of application No. 09/220,191, filed on Dec. 23, 1998, now Pat. No. 7,386,508, and a continuation-in-part of application No. 08/997,170, filed on Dec. 22, 1997, now Pat. No. 6,356,878, and a continuation-in-part of application No. 08/889,503, filed on Jul. 8, 1997, now Pat. No. 6,249,772.

(60) Provisional application No. 60/165,435, filed on Nov. 15, 1999.

(51) Int. Cl.
*G06Q 20/20* (2012.01)
*G06Q 40/00* (2012.01)
*G06Q 30/02* (2012.01)

(52) U.S. Cl.
CPC ..... *G06Q 30/0222* (2013.01); *G06Q 30/0283* (2013.01); *G06Q 30/06* (2013.01); *G06Q 30/0601* (2013.01); *G06Q 30/0621* (2013.01); *G06Q 40/12* (2013.12)

(58) Field of Classification Search
USPC ....................................................... 705/3–44
See application file for complete search history.

(56) References Cited

U.S. PATENT DOCUMENTS

| | | | |
|---|---|---|---|
| 4,237,537 A | 12/1980 | Pitches et al. | |
| 4,247,759 A | 1/1981 | Yuris | |
| 4,341,951 A | 7/1982 | Benton | |
| 4,449,186 A | 5/1984 | Kelly et al. | |
| 4,553,222 A | 11/1985 | Kurland et al. | |
| 4,554,446 A | 11/1985 | Murphy et al. | |
| 4,677,552 A | 6/1987 | Sibley, Jr. | |
| 4,734,858 A | 3/1988 | Schlafly | |
| 4,737,910 A | 4/1988 | Kimbrow | |
| 4,751,728 A | 6/1988 | Treat | |
| 4,766,548 A | 8/1988 | Cedrone et al. | |
| 4,789,928 A | 12/1988 | Fujisaki | |
| 4,799,156 A | 1/1989 | Shavit et al. | |
| 4,862,357 A | 8/1989 | Ahlstrom et al. | |
| 4,882,675 A | 11/1989 | Nichtberger et al. | |
| 4,903,201 A | 2/1990 | Wagner | |
| 4,931,932 A | 6/1990 | Dalnekoff et al. | |
| 4,947,028 A | 8/1990 | Gorog | |
| 4,992,940 A | 2/1991 | Dworkin | |
| 5,010,485 A | 4/1991 | Bigari | |
| 5,021,953 A | 6/1991 | Webber et al. | |
| 5,064,999 A | 11/1991 | Okamoto et al. | |
| 5,101,353 A | 3/1992 | Lupien et al. | |
| 5,117,354 A | 5/1992 | Long et al. | |
| 5,136,501 A | 8/1992 | Silverman et al. | |
| 5,168,446 A | 12/1992 | Wiseman | |
| 5,176,224 A | 1/1993 | Spector | |
| 5,191,410 A | 3/1993 | McCalley et al. | |
| 5,191,523 A | 3/1993 | Whitesage | |
| 5,191,613 A | 3/1993 | Graziano et al. | |
| 5,224,034 A | 6/1993 | Katz et al. | |
| 5,227,874 A | 7/1993 | Von Kohorn | |
| 5,243,515 A | 9/1993 | Lee | |
| 5,253,165 A | 10/1993 | Leiseca et al. | |
| 5,256,863 A | 10/1993 | Ferguson et al. | |
| 5,262,941 A | 11/1993 | Saladin et al. | |
| 5,283,731 A | 2/1994 | Lalonde et al. | |
| 5,297,031 A | 3/1994 | Gutterman et al. | |
| 5,305,195 A | 4/1994 | Murphy | |
| 5,319,542 A | 6/1994 | King, Jr. et al. | |
| 5,329,589 A | 7/1994 | Fraser et al. | |
| 5,353,218 A | 10/1994 | De Lapa et al. | |
| 5,361,199 A | 11/1994 | Shoquist et al. | |
| 5,367,452 A | 11/1994 | Gallery et al. | |
| 5,370,513 A | 12/1994 | Fain | |
| 5,375,055 A | 12/1994 | Togher et al. | |
| 5,404,291 A | 4/1995 | Kerr et al. | |
| 5,420,914 A | 5/1995 | Blumhardt | |
| 5,426,281 A | 6/1995 | Abecassis | |
| 5,434,394 A | 7/1995 | Roach et al. | |
| 5,444,630 A | 8/1995 | Dlugos | |
| 5,452,344 A | 9/1995 | Larson | |
| 5,467,269 A | 11/1995 | Flaten | |
| 5,482,139 A | 1/1996 | Rivalto | |
| 5,483,049 A * | 1/1996 | Schulze, Jr. | 705/14.13 |
| 5,495,412 A | 2/1996 | Thiessen | |
| 5,500,793 A | 3/1996 | Deming, Jr. et al. | |
| 5,513,117 A | 4/1996 | Small | |
| 5,515,268 A | 5/1996 | Yoda | |
| 5,517,555 A | 5/1996 | Amadon et al. | |
| 5,519,769 A | 5/1996 | Weinberger et al. | |
| 5,526,257 A | 6/1996 | Lerner | |
| 5,537,314 A | 7/1996 | Kanter | |
| 5,544,040 A | 8/1996 | Gerbaulet | |
| 5,546,316 A | 8/1996 | Buckley et al. | |
| 5,550,746 A | 8/1996 | Jacobs | |
| 5,553,131 A | 9/1996 | Minervino, Jr. et al. | |
| 5,557,088 A | 9/1996 | Shimizu et al. | |
| 5,557,517 A | 9/1996 | Daughterty, III | |
| 5,557,518 A | 9/1996 | Rosen | |
| 5,557,721 A | 9/1996 | Fite et al. | |
| 5,561,282 A | 10/1996 | Price et al. | |
| 5,570,283 A | 10/1996 | Shoolery et al. | |
| 5,583,763 A | 12/1996 | Atcheson et al. | |
| 5,590,197 A | 12/1996 | Chen et al. | |
| 5,592,375 A | 1/1997 | Salmon et al. | |
| 5,592,378 A | 1/1997 | Cameron et al. | |
| 5,598,375 A | 1/1997 | Yang et al. | |
| 5,606,602 A | 2/1997 | Johnson et al. | |
| 5,611,051 A | 3/1997 | Pirelli | |
| 5,611,052 A | 3/1997 | Dykstra et al. | |
| 5,612,527 A | 3/1997 | Ovadia | |
| 5,615,269 A | 3/1997 | Micali | |
| 5,631,724 A | 5/1997 | Sawada et al. | |
| 5,637,859 A | 6/1997 | Menoud | |
| 5,640,390 A | 6/1997 | Sakamoto et al. | |
| 5,664,115 A | 9/1997 | Fraser | |
| 5,689,652 A | 11/1997 | Lupien et al. | |
| 5,692,132 A | 11/1997 | Hogan | |
| 5,694,551 A | 12/1997 | Doyle et al. | |
| 5,696,965 A | 12/1997 | Dedrick | |
| 5,701,252 A | 12/1997 | Facchin et al. | |
| 5,708,782 A | 1/1998 | Larson et al. | |
| 5,710,886 A | 1/1998 | Christensen et al. | |
| 5,710,887 A | 1/1998 | Chelliah et al. | |
| 5,713,795 A | 2/1998 | Kohorn | |
| 5,715,402 A | 2/1998 | Popolo | |
| 5,717,989 A | 2/1998 | Tozzoli et al. | |
| 5,727,163 A | 3/1998 | Bezos | |
| 5,727,164 A | 3/1998 | Kaye et al. | |
| 5,732,398 A | 3/1998 | Tagawa | |
| 5,732,400 A | 3/1998 | Mandler et al. | |

(56) References Cited

U.S. PATENT DOCUMENTS

| | | |
|---|---|---|
| 5,734,150 A | 3/1998 | Brown et al. |
| 5,739,512 A | 4/1998 | Tognazzini |
| 5,745,882 A | 4/1998 | Bixler et al. |
| 5,754,653 A | 5/1998 | Canfield |
| 5,757,917 A | 5/1998 | Rose et al. |
| 5,758,328 A | 5/1998 | Giovannoli |
| 5,761,648 A | 6/1998 | Golden et al. |
| 5,768,142 A | 6/1998 | Jacobs |
| 5,774,870 A | 6/1998 | Storey |
| 5,774,874 A | 6/1998 | Veeneman et al. |
| 5,791,991 A | 8/1998 | Small |
| 5,794,207 A | 8/1998 | Walker et al. |
| 5,794,219 A | 8/1998 | Brown |
| 5,797,127 A | 8/1998 | Walker et al. |
| 5,799,284 A | 8/1998 | Bourquin |
| 5,799,285 A | 8/1998 | Klingman |
| 5,806,044 A | 9/1998 | Powell |
| 5,809,144 A | 9/1998 | Sirbu et al. |
| 5,816,918 A | 10/1998 | Kelly et al. |
| 5,822,736 A | 10/1998 | Hartman et al. |
| 5,822,737 A | 10/1998 | Ogram |
| 5,826,244 A | 10/1998 | Huberman |
| 5,832,452 A | 11/1998 | Schneider et al. |
| 5,832,457 A | 11/1998 | O'Brien et al. |
| 5,835,896 A | 11/1998 | Fisher et al. |
| 5,842,178 A | 11/1998 | Giovannoli |
| 5,845,259 A | 12/1998 | West et al. |
| 5,845,265 A | 12/1998 | Woolston |
| 5,848,399 A | 12/1998 | Burke |
| 5,855,007 A | 12/1998 | Jovicic |
| 5,857,175 A | 1/1999 | Day et al. |
| 5,864,604 A | 1/1999 | Moen et al. |
| 5,870,716 A | 2/1999 | Sugiyama et al. |
| 5,870,717 A | 2/1999 | Wiecha |
| 5,870,719 A | 2/1999 | Maritzen et al. |
| 5,875,110 A | 2/1999 | Jacobs |
| 5,878,139 A | 3/1999 | Rosen |
| 5,878,401 A | 3/1999 | Joseph |
| 5,883,810 A | 3/1999 | Franklin et al. |
| 5,887,271 A | 3/1999 | Powell |
| 5,890,136 A | 3/1999 | Kipp |
| 5,890,137 A | 3/1999 | Koreeda |
| 5,892,827 A | 4/1999 | Beach et al. |
| 5,897,622 A | 4/1999 | Blinn et al. |
| 5,905,246 A | 5/1999 | Fajkowski |
| 5,907,830 A | 5/1999 | Engel et al. |
| 5,909,793 A | 6/1999 | Beach et al. |
| 5,918,213 A | 6/1999 | Bernard et al. |
| 5,923,016 A | 7/1999 | Fredregill et al. |
| 5,924,078 A | 7/1999 | Naftzger |
| 5,924,080 A | 7/1999 | Johnson |
| 5,924,082 A | 7/1999 | Silverman et al. |
| 5,938,721 A | 8/1999 | Dussell et al. |
| 5,948,040 A | 9/1999 | DeLorme et al. |
| 5,960,411 A | 9/1999 | Hartman et al. |
| 5,963,939 A | 10/1999 | McCann et al. |
| 5,970,469 A | 10/1999 | Scroggie et al. |
| 5,979,757 A | 11/1999 | Tracy et al. |
| 5,988,346 A | 11/1999 | Tedesco et al. |
| 6,014,634 A | 1/2000 | Scroggie et al. |
| 6,017,157 A | 1/2000 | Garfinkle et al. |
| 6,035,284 A | 3/2000 | Straub et al. |
| 6,038,551 A | 3/2000 | Barlow et al. |
| 6,055,514 A | 4/2000 | Wren |
| 6,058,373 A | 5/2000 | Blinn et al. |
| 6,058,375 A | 5/2000 | Park |
| 6,061,660 A | 5/2000 | Eggleston et al. |
| 6,073,840 A | 6/2000 | Marion |
| 6,076,068 A | 6/2000 | DeLapa et al. |
| 6,085,168 A | 7/2000 | Mori et al. |
| 6,092,049 A | 7/2000 | Chislenko et al. |
| 6,108,672 A | 8/2000 | DeJoseph |
| 6,112,186 A | 8/2000 | Bergh et al. |
| 6,116,402 A | 9/2000 | Beach et al. |
| 6,119,099 A | 9/2000 | Walker et al. |
| 6,131,085 A | 10/2000 | Rossides |
| 6,134,534 A | 10/2000 | Walker et al. |
| 6,167,382 A | 12/2000 | Sparks et al. |
| 6,192,349 B1 | 2/2001 | Husemann et al. |
| 6,193,154 B1 | 2/2001 | Phillips et al. |
| 6,193,155 B1 | 2/2001 | Walker et al. |
| 6,199,014 B1 | 3/2001 | Walker et al. |
| 6,205,435 B1 | 3/2001 | Biffar |
| 6,236,971 B1 | 5/2001 | Stefik et al. |
| 6,247,047 B1 | 6/2001 | Wolff |
| 6,249,772 B1 | 6/2001 | Walker et al. |
| 6,260,024 B1 | 7/2001 | Shkedy |
| 6,266,651 B1 | 7/2001 | Woolston |
| 6,330,544 B1 | 12/2001 | Walker et al. |
| 6,370,513 B1 | 4/2002 | Kolawa et al. |
| 6,397,212 B1 | 5/2002 | Biffar |
| 6,450,407 B1 | 9/2002 | Freeman et al. |
| 6,497,360 B1 * | 12/2002 | Schulze, Jr. ............... 235/381 |
| 6,512,570 B2 | 1/2003 | Garfinkle et al. |
| 6,754,636 B1 | 6/2004 | Walker et al. |
| 6,839,679 B1 | 1/2005 | Lynch et al. |
| 6,885,994 B1 | 4/2005 | Scroggie et al. |
| 6,932,270 B1 | 8/2005 | Fajkowski |
| 7,107,228 B1 | 9/2006 | Walker et al. |
| 7,133,835 B1 | 11/2006 | Fusz et al. |
| 7,729,988 B1 | 6/2010 | Walker et al. |
| 7,966,222 B2 | 6/2011 | Scroggie et al. |
| 8,010,417 B2 | 8/2011 | Walker et al. |
| 8,150,735 B2 | 4/2012 | Walker et al. |
| 8,554,611 B2 * | 10/2013 | Roberts et al. ............. 705/14.1 |
| 8,700,484 B2 * | 4/2014 | Senior ...................... 705/26.2 |
| 2001/0001203 A1 | 5/2001 | McCall et al. |
| 2001/0053989 A1 | 12/2001 | Keller et al. |
| 2002/0040321 A1 | 4/2002 | Nicholson |
| 2007/0084917 A1 | 4/2007 | Fajkowski |
| 2013/0218700 A1 | 8/2013 | Walker et al. |

FOREIGN PATENT DOCUMENTS

| | | |
|---|---|---|
| EP | 0 370 146 A1 | 5/1990 |
| EP | 0 512 702 A2 | 11/1992 |
| EP | 0779587 A2 | 6/1997 |
| EP | 0779587 A3 | 6/1997 |
| EP | 0 817 138 A1 | 1/1998 |
| FR | 2 733 068 A1 | 10/1996 |
| JP | 6035946 | 2/1994 |
| JP | 7078274 | 3/1995 |
| JP | 7272012 | 10/1995 |
| JP | 8221484 | 8/1996 |
| JP | 9097288 | 4/1997 |
| JP | 10187820 | 7/1998 |
| JP | 10214284 | 8/1998 |
| JP | 10240830 | 9/1998 |
| JP | 10269049 | 10/1998 |
| JP | 11088560 A | 3/1999 |
| WO | WO 95/16971 | 6/1995 |
| WO | WO 96/13013 | 5/1996 |
| WO | WO 96/34356 A1 | 10/1996 |
| WO | WO 9632701 | 10/1996 |
| WO | WO 97/16797 | 5/1997 |
| WO | WO 97/16897 | 5/1997 |
| WO | WO 97/21200 | 6/1997 |
| WO | WO 97/21200 A2 | 6/1997 |
| WO | WO 97/23838 | 7/1997 |
| WO | WO 97/25684 A1 | 7/1997 |
| WO | WO 97/35441 | 9/1997 |
| WO | WO 97/44749 | 11/1997 |
| WO | WO 97/46961 | 12/1997 |
| WO | WO 98/10361 A1 | 3/1998 |
| WO | WO 98/15907 | 4/1998 |
| WO | WO 98/19260 | 5/1998 |
| WO | WO 98/21713 | 5/1998 |
| WO | WO 98/48388 | 10/1998 |
| WO | WO 98/48563 | 10/1998 |
| WO | WO 98/49658 | 11/1998 |
| WO | WO 99/04326 | 1/1999 |
| WO | WO 99/07121 | 2/1999 |
| WO | WO 99/09508 | 2/1999 |

(56) References Cited

FOREIGN PATENT DOCUMENTS

OTHER PUBLICATIONS

Naik, Gautam, "In Digital Dorm, Click on Return for Soda", The Wall Street Journal, Jan. 23, 1997, Section: Online, p. B1, 3 pp.
Quinn, Jane Bryant, "New Cars for Less", Newsweek, Oct. 23, 1978, Section: The Columnist, p. 80, 2 pp.
Joseph, Anthony, "Baby the engine, and other saving tips", The Christian Science Monitor, Nov. 4, 1986, Section: Autos '87 Pullout, p. B10, 3 pp.
"Six Vendors Sign on for Early Electronic Commerce Venture", Voice Technology News, Dec. 13, 1994, Section: No. 25, vol. 6, ISSN: 1045-1498, 2 pp.
Evans, Judith, "Who was that Masked Cybershopper? MasterCard-Visa Agreement on Credit Card Security May Make On-Line Commerce Fly", The Washington Post, Feb. 2, 1996, Section: Financial, p. F01, 2 pp.
Hilts, Paul, "Technology meets commerce; electronic publishing", Publishers Weekly, Jul. 8, 1996, Section: vol. 243, No. 28, p. 43, ISSN: 0000-0019, 4 pp.
"First Virtual Holdings Releases Beta Software for Secure Transactions on Microsoft Merchant Server", PR Newswire, Mar. 31, 1997, Section: Financial News 2 pp.
"My Auto Broker—Online Auto Broker", (http www advertlink. com/myautobroker/), download date: May 28, 1997. 4 pp.
"Pricewatch", (http //icon co za/~robo/prod01 ht.), download date: Jun. 9, 1997. 4 pp.
"The Easy, Pain-free Way to Buy or Lease Your Next Car!", (http wwwautoseek com/#what), download date: May 28, 1997. 4 pp.
Tooher, Nora Lockwood, "Macy's new gift card trial run in Warwick", The Providence Journal-Bulletin, Oct. 1, 1998, Section: Business, 9. 1E. 2 pp.
Caruso, Denise, "Digital Commerce; The boom in on-line shopping adds a twist to the old quandary of how to tax interstate purchases.", The New York Times, Dec. 28, 1998, 3 pp.
Fallon, James, "Safeway Puts Ordering into Customers' Palms", Executive Technology, Jan. 1999. 1 pp.
"SaveSmart—How SaveSmart Work for Consumers", (http //www savesmartcom/consumer/consumer_howitworks html), download date: Jan. 17, 1999, 7 pp.
"Groceries Online—The Leader in Internet Shopping Systems for Supermarkets and Drug Stores", (http www groceries-online com/), download date: Mar. 8, 1999. 4 pp.
"WebVoucher Form", (http www pinex co uk/webvoucher/), download date: Mar. 14, 1999. 2 pp.
"Welcome to plant U, providers of U-pons—Internet Coupons", (http www planet com/), download date: Mar. 16, 1999. 8 pp.
"WebCertificate.com", (http //www webcertificate corn 80/webcert/default asp), download date: May 20, 1999, 14 pp.
"Kmart Expands Inventors Via In-Store Kiosks", RT News, Jun. 1999, p. 20. 1 pp.
Lazarus, David, "E-Commerce, Japanese Style", Wired online Jun. 7, 1999.
"Mercata—Group Buying Power", (http //www mercatacom/cgi_bin/mercata/mercata/v1/pages/home jsp), download date: Jun. 7, 1999, 5 pp.
"Wal-Mart vs. Amazon: The fight begins", Yahoo News Page, Jun. 9, 1999. 3 pp.
"Circuit City to Integrate E-Commerce With Store Shopping; Retailer's Superstore—www Circuitcity com—to Open in Jul.", PR Newswire, Jun. 15, 1999. 3 pp.
Frederick, James, "Walgreens gears for opening of its own Internet pharmacy", Drug Store News—Chain Pharmacy, Jul. 19, 1999, vol. 9, No. 7. 2 pp.
"Coupons and More—Welcome to coolsavings com", www coolsavings com, copyright 1996-1999, 3 pp.
"Welcome to 1-800-Flowers", (http://www.1800flowers com/flowers/welcome asp), download date Mar. 8, 1999, 4 pp.

"Internet Wine Gift Company Offers Answers to Recent Legislation", (http //biz (yahoo com/prnews/990810/ma_send_co_1 html), download date: Aug. 11, 1999, 2 pp.
Desjardins, Doug, "Hollywood's Investment in Online Video Retailer Gets Mixed Reviews", Video Store, Aug. 9, 1998, Section: p. 1, ISSN: 0195-1750. 3 pp.
"FAQ: CSH Coke Machine Information", FAQ, Institute of Information & Computer Sciences, vol. 1.2, May 23, 1994.
"Brother Industries is pushing ahead with its new PC software vending machine operation in a bid to boost revenues in the field to 10 billion yen by 1995", IDC Japan Report, Aug. 30, 1991, Section: vol. 17, p. 53.
Website: "Pricing, The Professional Pricing Society Conference Agenda", (http//www pricing-advisor com/conf_agn htm), download date: Jun. 19, 1999, 10 pp.
Shea, Barbara, "Read Fine Print When Comparing Car Rentals", Feb. 9, 1997, St. Louis Post-Dispatch, Section: Travel & Leisure, p. 04T, 2 pp.
Godwin, Nadine, "New software was key lure in $17 million agency buyout.", Travel Weekly, Nov. 26, 1984, Section: vol. 43, p. 45, ISSN: 0041-2082, 4 pp.
Kuttner, Robert, "Computers May Turn the World into One Big commodities Pit.", Business Week, Sep. 11, 1989, Section: Economic Viewpoint, No. 3123, p. 15, 3 pp.
Del Rosso, Laura, "Firm proposes ticket-bidding system; Marketel explores electronic auction of travel; Marketel International:", Travel Weekly, No. 13, 1989, Section: No. 91, vol. 48, p. 1, ISSN: 0041-2082, 3 pp.
Tellis, Gerard J., "Beyond the Many Faces of Price: An Integration of Pricing Strategies", Journal of Marketing, Oct. 1986, vol. 50, pp, 146-160. 15 pp.
Weatherford, Lawrence R. et al., "A Taxonomy and Research Overview of Perishable-Asset Revenue Management: Yield Management, Overbooking, and Pricing", Operations Research, Sep.-Oct. 1992, vol. 40, No. 5, pp. 831-844. 14 pp.
Spencer, Milton, II. et al., "Contemporary Economics", Worth Publishers, Copyright 1993, pp. 567-570. 6 pp.
Rajendran, K. N., "Contextual and Temporal Components of Reference Price", Journal of Marketing, Jan. 1994, vol. 58, pp. 22-34. 13 pp.
Adyanthaya, Surain, "Revenue management: the Black Art", Interavia Business & Technology, Sep. 1998, Section: No. 623, vol. 53, p. 43, ISSN: 0983-1592, 4 pp.
Woolley, Scott, "I got it cheaper than you", Forbes, Nov. 2, 1998, Section: Management, Strategies, Trends, p. 82. 4 pp.
Press Release: "Priceline com Delivers Savings for Flexible Travelers in Side-By-Side Price Comparison", May 28, 1999, 4 pp.
Odlyzko, Andrew; "The Bumpy Road of Electronic Commerce", (http //aaceVirginia edu/aace/conf/webnet/html/ao htm), download date: Jul. 1, 1999. 17 pp.
Kephart, Jeff, Price Dynamics of Vertically; Introduction, Aug. 15, 1998, 3 pp.
"United Buying Services", (http www inform umd edu/muc/clubinfo/ubs html), download date: Apr. 15, 2003. 2 pp.
Stigler, George J., "The Theory of Price", The Macmillan Company, Copyright 1952, 14 pp.
Stigler, George J., "The Theory of Price", The Macmillan Company, Copyright 1966, 8 pp.
Narasimhan, Chakravarthi, "A Price Discrimination Theory of Coupons", Marketing Science, Spring 1984, 20 pp.
"Woodside Management Systems Inc. today announced . . . ", PR Newswire, Apr. 1, 1986, 2 pp.
Godwin, Nadine, "Agency, funded by 3M, set to market software; Travelmation touts trip planner to corporation; designed to eliminate client-agent telephone calls; Business Travel Update", Travel Weekly, Oct. 13, 1986, 4 pp.
Godwin, Nadine, "Agency dares to launch its own air res system; Travelmation system provides greater versatility, Automation Report", Travel Weekly, Oct. 23, 1986, 5 pp.
"Thomas Cook Travel U.S.A. has announced . . . ", PR Newswire, Jan. 12, 1987, 2 pp.

(56) References Cited

OTHER PUBLICATIONS

Bawa, Kapil et al., "The Coupon-Prone consumer: some Findings Based on Purchase Behavior Across Product Classes", Journal of Marketing, Oct. 1987, 12 pp.
Nomani Sr., A., "Air Crashes Stir Signs of Anxiety in Travelers", Wall Street Journal, Aug. 1, 1989, 4 pp.
Carlsen, Clifford, "From Airline Tickets to Human Organs, the Electronic Markets are Booming", San Francisco Business Times, Aug. 14, 1989, 2 pp.
Golden, Fran, "AAL's Riga doubts Marketel's appeal to retailers", Travel Weekly, Nov. 13, 1989, Section: vol. 48, No. 91, 2 pp.
"Letters to BusinessExtra", The San Francisco Chronicle, Dec. 26, 1989, Section: Business, 3 pp.
Wallace, David, "Company Planning to Let Flyers bid on Airfares", Philadelphia Business Journal, Mar. 26, 1990, 3 pp.
Greenberg, Peter S., "The Savvy Traveler: Lower Air Fares for Consumers Not in the Cards . . . " Los Angeles Times, Jul. 8, 1990, 2 pp.
Carey, Christopher, "Firm Offers Auction for Airline Tickets", St. Louis Post-Dispatch, Aug. 7, 1991, 2 pp.
Pelline, Jeff; "Travelers Bidding on Airline Tickets SF firm offers chance for cut-rate fares", The San Francisco Chronicle, Aug. 19, 1991, 4 pp.
Upton, Kim, "News and Briefs: French Say Monoliths Off-Limits to Visitors", Los Angeles Times, Aug. 25, 1991, 2 pp.
"Bookit Airfare Bidding System (Fax for Your Plane Ticket?)", Consumer Reports Travel Letter, Sep. 1991, 3 pp.
Nelson, Janet, "Practical Travelers; Airlines Relaxing Policy on No-Refund tickets", The New York Times, Sep. 22, 1991, 4 pp.
"Traveler's Notes; Easier Airfare Bidding.", Consumer Reports Travel Letter, Oct. 1991, 1 pg.
"Buy Low, Fly High", USA Today, Nov. 14, 1991, 2 pp.
Feldman, Joan M., "To rein in those CRSs; computer reservation systems" Air Transport World, Dec. 1991, 5 pp.
"Traveler's Notes; Bookit Report", Consumers Reports Travel Letter, Dec. 1991, Section: vol. 7, No. 12, p. 143, 3 pp.
"CRTL's Blue Ribbon Deals for 1992", Consumer Reports Travel Letter, Jan. 1992, 2 pp.
"Newsletters", The Atlanta Journal and Constitution, Mar. 1, 1992 1 pg.
Del Rosso, Laura, "Ticket-bidding firm closes its doors, Marketel International", Travel Weekly, Mar. 12, 1992, 2 pp.
Hainer, Cathy et al., "Where vacationing kids get good care", USA Today, Apr. 1, 1992, Section: Life, 2 p.
Feldman, Joan M., "Reclaiming control; new software to close gap between projected and actual revenues", Aug. 1995, 5 pp.
*United States v. Eastman Kodak Co.*, United States Court of Appeals for the Second Circuit Docket No. 97-6190, decided Aug. 4, 1995, 16 pp.
Prentice, Michael, "Searching for the lowest fare; Getting the lowest fare takes work, but it's worth the effort", The Ottawa Citizen, Oct. 9, 1996, 3 pp.
"Auctioning unsold airline ticket", Insight (USA), download date: Oct. 29, 1996, 1 pg.
"Web Ventures presents Bookit!", (http www webventures com/ bookit), download date: Dec. 2, 1996, 1 pg.
Salomon Brother's Maldutis Says Internet is Aviation's 'Third Revolution;' will Earn Billions, World Airline News, Mar. 21, 1997, 2 pp.
Website:"Computer Science House: Projects; Drink Machine", (http //www csh rite edu/proj/drink html), download date: Jan. 29, 1998, 2 pp.
Feldman, Joan M., "Pricing and cybersales; Internet airline ticket sales and reservations", Feb. 1998, Section: No. 2, vol. 35, 4 pp.
"A Personal Information Manger for the Web Savvy Consumer.", (http www killerapp com/html/main/pr0004 html), Oct. 2, 1998, 2 pp.
"Airfare Bargains on the Net: About E-mail Lists", (http //travel epicurious com/travel/c_planning/02_airfares/email/intro html), download date: Oct. 5, 1998, 17 pp.

"Airtech—FlightPass Faq", (http //www airtech com/at_flightpass/ at_faqflightpass htm), download date: Oct. 5, 1998, 4 pp.
"Travel Industry Bellwether for All Commerce Players", Jupiter Communications, Copyright 1999, Jupiter Strategic Planning Services, 2 pp.
"Chakravarthi Narasimhan", (http www olin wustl edu/faculty/ narasimhan/), download date: Jul. 1, 1999, 2 pp.
Varian, Hal R., "First Monday: Differential Pricing and Efficiency", (http www firstmonday dk/issues/issue2/different/, download date: Jul. 1, 1999, 18 pp.
"Pricing Strategy and Tactics", (http /www Vanderbilt edu/econ/ reiley/ba250/outlines/21 html), download date: Jul. 1, 1999, 3 pp.
Bowman, Jr., Ward S., "Tying Arrangements and the Leverage Problem", The Yale Law Journal, Nov. 1957, 10 pp.
Mazany, Leigh, "Multi-Product allocation under imperfect raw material supply conditions: the case of fish products", Applied Economics, Mar. 1996, 14 pp.
The Impact of Product Substitution on Profitability, INFORMS Seattle 1998, 2 pp.
Cortese, Amy E., "Good-bye to Fixed Pricing?", Business Week, May 4, 1998, 6 pp.
Dealtime.com The Ultimate Online Shopping Service, Oct. 20, 1999, 6 pp.
Personify, (www personify com / about/ aboutbodyhome. asp), download date: Nov. 11, 1999, 5 pp.
HNC Software, Inc., (www. hncs. Com / company /com05.htm) download date: Nov. 11, 1999, 1 pg.
Etown.com The Home Electronics Guide is Divided Into five Main Areas, http: community. Etown . com/update/articles) download date: Nov. 11, 1999, 2 pp.
Frictionless Commerce Incorporated: Solutions www. frictionless . com/solutions.html), download date: Nov. 11, 1999, 2 pp.
Sierra Merchandise Company, Gifts Things and other Merchandises; www.pricelthis. com download date: Nov. 11, 1999, 1 pg.
PriceSCAN Frequently Asked Questions, (www. pricescan. Com/ faq.asp) download date: Nov. 11, 1999, 2 pp.
Verbind Technology, Frequently Asked Questions, (www. verbind. com /faq. html) download date: Nov. 11, 1999, 6 pp.
Bid.Com 1998 Third-Quarter Revenue Increases 12.5 Percent From Second Quarter, Business Wire, Oct. 29, 1998, 5 pp.
About IAO, www. iaoauction.com, Sep. 8, 1997, 6 pp.
Onsale: Auction Supersite, www. onsale. Com, Sep. 8, 1997, 2 pp.
NASDAQ, What is NASDAQ, http: // home. Axford.com, Aug. 15, 1997, 3 pp.
NASDAQ Consolidated Subscriber Agreement, www. pcquote. com/exchanges Aug. 15, 1997, 3 pp.
TradingFloor.com: General trading Information and terms, Aug. 14, 1997, 11 pp.
HomeShark; Refinance Check, www. homeshark. Com, Aug. 13, 1997, 6 pp.
The Loan Process, www. sdtech .com/mis / process, Sep. 30, 2003, 3 pp.
Trade-Direct: We Help You Trade With Confidence, Aug. 6, 1997, 2 pp.
Classifieds2000: The Internet Classifieds, www. classifieds200. Com, Aug. 6, 1997, 3 pp.
Internet Mortgage Service Eliminates Loan Agents and Passes Commissions on to Consumer, Yahoo Business Wire, Jun. 30, 1997, 2 pp.
Frequently Asked Questions about AIRHITCH, www. isicom . com.fr/ airhitch, May 6, 1997, 5 pp.
Airhitch: Your Way to Low Cost Travel, www. vaportrails . com, May 6, 1997, 2 pp.
Kelsey, J. and Schneier, B., Conditional Purchase Orders, AMC Conference on Computer and Communications Security, Apr. 1997, 8 pp.
Bryant, Adam, Shaking up Air fares Status Quo, The New York Times, Mar. 31, 1997, 4 pp.
GM Drives Web Ad Insertion Network, Inside Media, Feb. 26, 1997, 1 pg.
"TransQuest and Web Ventures Deliver Internet Booking for Delta Air Lines", PR Newswire, Dec. 10, 1996, 2 pp.

(56) References Cited

OTHER PUBLICATIONS

"Affinicast Enables Web Sites That Listen and Adapt to Customer Affinities", PR Newswire, Dec. 3, 1996, 2 pp.
UK's World Telecom Unveils New WorldSaver Tariffs, Newsbytes, Feb. 13, 1997, 1 pg.
"Web Ventures Presents Bookit!", http: www. webventures . com/bookit/ Dec. 2, 1996, 1 pg.
World's First Real-Time Travel Auction Service to Be Available Via World Wide Web: ETA to Open Bidding to Consumers, Business Wire, Nov. 4, 1996, 2 pp.
CREST: Cruise/Ferry Revenue Management System, www. rtscorp.com, Aug. 5, 1996, 5 pp.
Nishimoto, Lisa, "Travel; Services Are First Online Commerce Offerings to Fly", Infoworld, Jul. 29, 1996, 2 pp.
About Rate Hunter, Jul. 14, 1996, 2 pp.
Cathay Pacific Online Ticket-Bidding, World Internet News Digest, May 8, 1996, 1 pg.
Sotheby's General Information, www. sothebys . com, 1996, 2 pp.
CyberBid, Net Fun Ltd. 1996, 9 pp.
Nimmer, Raymond, T. "Electronic Contracting; Legal Issues", 14 J. Marshall J. Computer & Info., Winter 1996, 26 pp.
American Law Institute, Draft Uniform Commercial Code Revised Article 2, Jan. 4, 1996, 24 pp.
Speidel, Richard E. & Schott, Lee A., Impact of Electronic Contracting on Contract Formation Under Revised UCC Article 2, Dec. 9, 1993, 4 pp.
Del Rosso, Laura, Marketel Says It Plans to Launch Air Fare Auction in June, Travel Weekly, Apr. 29, 1991, 3 pp.
NASDAQ Adds Enhancements to SOES Limit Order File, Security Week, Nov. 26, 1990, 1 pg.
Schrage, Michael, Laboratory Experiments with Market Economics, Los Angeles Times, Nov. 23, 1989, 3 pp.
Schrage, Michael, "An Experiment in Economic Theory; Labs Testing Real Markets", The Record, Nov. 26, 1989, 3 pp.
CSM Online Collectors Super Mall, Apr. 23, 1998, 4 pp.
"About Cyberslice", (http //www cyberslice com/cgi bin/WebObjects/Cyberslice 2@httpservO1/), May 6, 1997, 2 pp.
Bronnenberg, Bart J., "Limited Choice Sets, Local Price Response and Implied Measure of Price Competition", Journal of Marketing Research, May 20, 1996, 20 pp.
Fishkin, Ken, "Foresight Exchange Tutorial", www.ideosphere.com/fx/docs/tutorial.html, download date: Dec. 15, 2009, 5 pp.
Ritter, Jeffrey 8., Scope of the Uniform Commercial Code: Computer Contracting Cases and Electrical Commercial Practices, Aug. 1990, 20 pp.
American Airlines Internet Silent Auction, www.Americanair.com, Aug. 1996, 8 pp.
Apollo Host Computer, www. apollo. com, available as of at least Dec. 12, 2009, 4 pp.
Cathay Pacific Cyber Traveler Auction #3, www.cathaypacifi .com, Rules updated Jul. 30, 1996, 4 pp.
Sabre Decision Technologies, www.sabre.com, available as of at least Dec. 12, 2009, 6 pp.
Phone Miser: Frequently Asked Questions, www.phonemiser.com, Jun. 1, 1997, 8 pp.
The United Computer Exchange, How it all works, www.uce.com, download date: Jul. 23, 1997, 6 pp.
Tired of shopping for the Best Home Load?, Mortgage Loan Specialists, facsimile dated Aug. 7, 1997, 2pp.
Godwin, Nadine, "New software was key lure in $17 million agency buyout", Travel Weekly, Nov. 26, 1984 Reed Travel Group.
Economic viewpoint: No. 3123: p. 17, Computers may turn the world into one big commodities Pit, Copyright 1989 McGraw-Hill, Inc., Business Week, Sep. 11, 1989.
Del Roggo, Laura, "Firm proposes ticket-bidding system: Marketol explores electronic auction of travel; Marketel International", Nov. 13, 1999, Travel Weekly, Section No. 91, vol. 48; p. 1; ISSN 0041-2082.
Weatherford et al., "A taxonomy and research overview of perishable asset revenue management; yield management, overbooking and pricing", Operations research, vol. 40, No. 5, Sep.-Oct. 1992.
Jeff Kephart, "Price Dynamics of Vertically Previous: Price Dynamics of Vertically", Sat Aug. 1998.
Odlyzko, "The Bumpy Road of Electronic Commerce", AT&T Labs—Research, Jul. 1999.
Professional pricing society Conference Agenda, Wednesday, Apr. 28, 1999.
Spencer et al., Contemporary Economics, Eigth Edition, ISBN: 0-B7901-614-0, Copyright © 1993, 1990, 1986, 1983, 1980, 1977, 1974, 1971.
"Limited Choice Sets, local Price Response, and Implied Measures of Price Competition", Journal of Marketing Research, Spring 1996.
Adyanthaya, Surain, "Revenue management the Back Art", Intervia Business & Technology, Section: No. 623, vol. 53, p. 43: ISSN: 0983-1592, Sep. 1998.
"Priceline.com Delivers Savings for flexible Travelers in Side-By-Side Price Comparison", Stamford, Conn., May 28, 1999.
Notice of Allowability for U.S. Appl. No. 08/889,503 received May 26, 2000, 6 pp.
Office Action for U.S. Appl. No. 08/889,503 received Oct. 8, 1998, 10 pp.
Office Action for U.S. Appl. No. 08/889,503 mailed Oct. 26, 1999, 7 pp.
Supplemental Notice of Allowability for U.S. Appl. No. 09/059,594 mailed May 26, 2000, 2 pp.
Notice of Allowance for U.S. Appl. No. 09/220,191 mailed Jun. 25, 2007, 9 pp.
Office Action for U.S. Appl. No. 09/220,191 mailed Oct. 6, 2006, 5 pp.
Office. Action for U.S. Appl. No. 09/220,191 mailed Dec. 5, 2001, 5 pp.
Notice of Allowance for U.S. Appl. No. 09/337,906 mailed Nov. 28, 2003, 7 pp.
Office Action for U.S. Appl. No. 09/337,906 mailed Dec. 17, 2002, 12 pp.
Office Action for U.S. Appl. No. 09/337,906 mailed Apr. 24, 2002, 28 pp.
Office Action for U.S. Appl. No. 09/359,265 mailed Jul. 24, 2009, 15 pp.
Office Action for U.S. Appl. No. 09/359,265 mailed Dec. 17, 2007, 7 pp.
Office Action for U.S. Appl. No. 09/359,265 mailed Jun. 23, 2005, 4 pp.
Office Action for U.S. Appl. No. 09/359,265 mailed Jan. 27, 2005, 7 pp.
Office Action for U.S. Appl. No. 09/359,265 mailed Feb. 20, 2004, 8 pp.
Office Action for U.S. Appl. No. 09/359,265 mailed Sep. 4, 2003, 6 pp.
Office Action for U.S. Appl. No. 09/359,265 mailed Apr. 22, 2003, 4 pp.
Office Action for U.S. Appl. No. 09/388,723 mailed Apr. 21, 2004, 11 pp.
Office Action for U.S. Appl. No. 09/388,723 mailed Oct. 22, 2003, 8 pp.
Office Action for U.S. Appl. No. 09/388,723 mailed Apr. 30, 2003, 29 pp.
Office Action for U.S. Appl. No. 09/388,723 mailed Oct. 2, 2002, 26 pp.
Notice of Allowance for U.S. Appl. No. 09/540,035, dated Mar. 23, 2010; 8 pp.
Notice of Allowability for U.S. Appl. No. 09/540,035, mailed Nov. 16, 2009, 6 pp.
Office Action for U.S. Appl. No. 09/540,035 mailed May 15, 2009, 5 pp.
Office Action for U.S. Appl. No. 09/540,035 mailed Aug. 25, 2006, 12 pp.
Office Action for U.S. Appl. No. 09/540,035 mailed Jan. 4, 2006, 9 pp.
Office Action for U.S. Appl. No. 09/540,035 mailed Jul. 5, 2005, 7 pp.

(56) References Cited

OTHER PUBLICATIONS

Office Action for U.S. Appl. No. 09/540,035 mailed Jun. 15, 2004, 10 pp.
Office Action for U.S. Appl. No. 09/540,035 mailed Oct. 23, 2003, 6 pp.
Office Action for U.S. Appl. No. 09/591,594 mailed Jun. 28, 2005, 6 pp.
Office Action for U.S. Appl. No. 09/591,594 mailed Nov. 30, 2004, 12 pp.
Office Action for U.S. Appl. No. 09/591,594 mailed Feb. 6, 2004, 9 pp.
Office Action for U.S. Appl. No. 09/591,594 mailed Jun. 18, 2003, 7 pp.
Office Action for U.S. Appl. No. 11/410,342 mailed Aug. 29, 2008, 11 pp.
Office Action for U.S. Appl. No. 11/410,342 mailed Oct. 14, 2009, 12 pp.
Office Action for U.S. Appl. No. 11/410,342 mailed Jun. 14, 2010, 12 pp.
Office Action for U.S. Appl. No. 11/424,289 mailed Sep. 28, 2010, 10 pp.
Office Action for U.S. Appl. No. 11/424,291 mailed Aug. 10, 2009, 19 pp.
Office Action for U.S. Appl. No. 11/424,294 mailed Mar. 24, 2009, 10 pp.
Notice of Allowance U.S. Appl. No. 11/424,294 mailed Apr. 14, 2011, 7 pp.
Office Action for U.S. Appl. No. 11/746,714 dated Nov. 13, 2007.
Office Action for U.S. Appl. No. 11/746,714 dated Jun. 16, 2008.
Office Action for U.S. Appl. No. 11/746,714 dated Jan. 27, 2009.
Office Action for U.S. Appl. No. 11/746,714 dated Sep. 22, 2009.
Office Action for U.S. Appl. No. 11/746,714 dated Mar. 29, 2010.
Notice of Allowance for U.S. Appl. No. 11/746,714 dated Sep. 17, 2010.
Office Action for U.S. Appl. No. 11/746,714 dated Dec. 22, 2010.
Notice of Allowance U.S. Appl. No. 11/746,714 dated Jul. 8, 2011.
Notice of Allowance U.S. Appl. No. 11/746,714 dated Oct. 31, 2011.
Office Action for U.S. Appl. No. 13/619,579 dated Jul. 9, 2013.
Written Opinion for PCT/US98/13977, mailed Jul. 1, 1999, 6 pp.
International Search Report for Application No. PCT/US98/13977 dated Oct. 19, 1998.
Written Opinion for PCT/US00/12640 mailed Aug. 4, 2001, 4 pp.
Office Action for PCT Application No. PCT/US00/16998 completed Apr. 6, 2005, 3 pp.
Notice of Acceptance for Australian Application No. 775975, mailed Jul. 13, 2004, 2 pp.
Office Action for Canadian Application No. 2,295,079 mailed May 4, 2004, 9 pp.
Supplementary Search Report for European Application No. 98 93 3186, Feb. 28, 2005, 2 pp.
"Internet Access: TechnologyNet, Inc. launches computer industry's most extensive website unifying more than 2000 dealers resellers, manufacturers and software publishers from 40 countries", EDGE: Work-Group Computing Report, Dec. 16, 1996.
Bragg, James W.; "Car Buyer's and Leaser's Negotiating Bible"; 1996.
Office Action for U.S. Appl. No. 11/410,342, dated Jul. 31, 2014.
Office Action for U.S. Appl. No. 11/681,441, dated Sep. 10, 2014.
Cyr, Diane "Double click on privacy", Catalog Age, V12, n9, Sep. 1, 1995. Retrieved from Dialog File: 15, Acc#: 01144345.

Prewitt, Milford "Internet security providers pushing to ease jitters of online marketers", Nation's Restaurant News, v30, N34, Sep. 2, 1996. Retrieved from Dialog File: 15, Acc#: 01282540.
http://web.archive.org/web/19961029153454/www.autobytel.com/march12.html retrieved on Nov. 19, 2004.
"Autozone Zooms Into High-Tech (Autozone achieves customer satisfaction through in-house, custom computer applications)" Dec. 1994, Aftermarket Business, p. 20. As submitted on Nov. 24, 2009, pp. 431-434.
Stewart, John "Rocky year looms for municipal courses", The Sun, Mar. 14, 1993, 4 pp.
U.S. Appl. No. 08/858,738, filed May 19, 1997, In re: Walker et al. entitled *System and Process for Issuing and Managing Forced Redemption Vouchers Having Alias Account Numbers* (abandoned).
U.S. Appl. No. 09/285,201, filed Apr. 1, 1999, In re: Walker et al.
U.S. Appl. No. 09/316,546, filed May 21, 1999, In re: Walker et al. entitled *Method and Apparatus for Processing Credit Card Transaction*, issued as US Pat. No. 7,729,988 on Jun. 1, 2010.
Written Opinion for PCT/US00/16983 mailed Aug. 3, 2001, 4 pp.
Office Action for U.S. Appl. No. 08/889,503 mailed Oct. 1, 1999, 7 pp.
Office Action for U.S. Appl. No. 08/889,503 mailed Jun. 22, 1999, 4 pp.
Office Action for U.S. Appl. No. 08/889,503 mailed Sep. 11, 1998, 10 pp.
Office Action for U.S. Appl. No. 09/337,906 mailed Dec. 17, 2003, 12 pp.
Notice of Allowance for U.S. Appl. No. 09/540,035 mailed Dec. 23, 2009, 10 pp.
Supplemental Examiner's Answer for U.S. Appl. No. 09/540,035 mailed Dec. 10, 2008, 17 pp.
Examiner's Answer for U.S. Appl. No. 09/540,035 mailed Nov. 28, 2007, 14 pp.
Notice of Panel Decision for U.S. Appl. No. 09/540,035 mailed Mar. 7, 2007, 2 pp.
Notice of panel Decision for U.S. Appl. No. 09/540,035 mailed May 19, 2006, 2 pp.
Notice of Allowance for U.S. Appl. No. 09/591,594 dated Nov. 22, 2005.
Notice of Allowance for U.S. Appl. No. 09/591,594 dated Feb. 7, 2006.
Notice of Allowance for U.S. Appl. No. 09/348,566 mailed Apr. 25, 2005, 6 pp.
Office Action for U.S. Appl. No. 09/348,566 mailed Jun. 15, 2004, 12 pp.
Office Action for U.S. Appl. No. 09/348,566 mailed Oct. 1, 2003, 6 pp.
Office Action for U.S. Appl. No. 09/348,566 mailed Oct. 23, 2002, 16 pp.
Office Action for U.S. Appl. No. 09/348,566 mailed Feb. 6, 2002, 18 pp.
Office Action for U.S. Appl. No. 09/540,214 mailed Oct. 19, 2006, 18 pp.
Office Action for U.S. Appl. No. 09/540,214 mailed Jul. 7, 2006, 20 pp.
Office Action for U.S. Appl. no. 09/540,214 mailed Mar. 8, 2006, 16 pp.
Office Action for U.S. Appl. No. 09/540,214 mailed Jun. 22, 2004, 16 pp.
Office Action for U.S. Appl. No. 09/540,214 mailed Aug. 29, 2002, 24 pp.
Office Action for U.S. Appl. No. 13/437,706 dated Jun. 1, 2015.
Advisory Action from U.S. Appl. No. 13/437,706, dated Aug. 19, 2015.

* cited by examiner

| OFFER IDENTIFIER 402 | CUSTOMER IDENTIFIER 404 | MANUFACTURERS 406 | FEATURES 408 | PICKUP LOCATIONS 410 | PRODUCT STATES 412 | OFFER STATUS 414 |
|---|---|---|---|---|---|---|
| T-101555 | C-4321333 | SONY, MAGNAVOX, OR TOSHIBA | PIP | STAMFORD OR HARTFORD | NEW | PENDING SYSTEM |
| T-333010 | C-9876555 | SONY | 30" SCREEN, AND PIP | NEW YORK | NEW OR FLOOR MODEL | ACCEPTED BY CUSTOMER |
| T-654321 | C-1234567 | MAGNAVOX | PIP | TEANECK | NEW | REDEEMED |
| T-999876 | C-8777665 | ANY | UNIVERSAL REMOTE, AND V-CHIP | BOSTON | NEW OR USED | DENIED BY CUSTOMER |
| T-753642 | C-6123234 | TOSHIBA | UNIVERSAL REMOTE, AND V-CHIP | PROVIDENCE | NEW | PENDING CUSTOMER |

FIG. 4A

| OFFER IDENTIFIER 402 | CUSTOMER IDENTIFIER 404 | OFFER STATUS 414 | OFFERED PRICE 416 |
|---|---|---|---|
| T-101556 | C-3334321 | PENDING CUSTOMER | $200 |
| T-100333 | C-6789555 | ACCEPTED BY CUSTOMER | $150 |
| T-654123 | C-7654321 | REDEEMED | $10 LESS THAN RETAIL |
| T-876999 | C-5888777 | DENIED BY CUSTOMER | 20% OFF RETAIL |
| T-642753 | C-8234123 | PENDING SYSTEM | $400 to $425 |

| CUSTOMER IDENTIFIER 502 | CUSTOMER NAME 504 | CUSTOMER CONTACT INFORMATION 506 | PAYMENT IDENTIFIER 508 |
|---|---|---|---|
| C-4321333 | JANE DOE | 170 CENTER ST. NOWHERE, CA 90210 | CC-4444-3333-2222-1111 |
| C-1234222 | CLIFFORD BROWNIE | CBROWNIE@ADDRESS.COM | CC-5555-4444-3333-2222 |
| C-6789555 | MILES DAVIE | (555) 222-1221 | CC-6666-5555-4444-3333 |
| C-1234567 | ELIE PAUL | 1 SMART WAY NY, NY 10023 | PAID |
| C-5888777 | STINGFORD FALL | 2 CEDAR LANE STAMFORD, CT 06900 | CC-7777-6666-5555-4444 |

FIG. 5

PRODUCT CATEGORY: STANDARD TV

| CONDITION VALUE 630 | FLEXIBILITY POINTS 640 | WEIGHTING FACTOR 650 |
|---|---|---|
| SONY | +10 | 5 |
| MAGNAVOX | +10 | 0.5 |
| TOSHIBA | +10 | 1 |
| STEREO SOUND | -5 | 4 |
| V-CHIP | -5 | 1 |
| PIP | -5 | 3 |
| STAMFORD | +10 | 2 |
| HARTFORD | +10 | 3 |
| NEW | +15 | 1 |
| FLOOR MODEL | +15 | 4 |

| FLEXIBILITY SCORE 710 | SALE PRICE FOR PRODUCT P-100 740 |
|---|---|
| 61-80 | $150 |
| 41-60 | $200 |
| 21-40 | $250 |
| 0-20 | $300 |
| -15-0 | $350 |

FIG. 7C

PRODUCT CATEGORY: STANDARD TV

| CONDITION 750 | REQUIREMENT 760 | % DISCOUNT 770 |
|---|---|---|
| MANUFACTURER | 1 VALUE | 0% |
| | 2 VALUES | 5% |
| | 3 VALUES | 10% |
| FEATURE | 1 VALUE | 10% |
| | 2 VALUES | 5% |
| | 3 OR MORE VALUES | 0% |
| PICKUP LOCATION | 1 VALUE | 0% |
| | MORE THAN 1 VALUE | 5% |
| STATE OF PRODUCT | 1 VALUE | 0% |
| | MORE THAN 1 VALUE | 5% |

| PRODUCT CATEGORY: STANDARD TV | |
|---|---|
| % DISCOUNT <u>810</u> | DESCRIPTION BROADENING RULES <u>820</u> |
| 0-10% | 1 MANUFACTURER<br>3 GUARANTEED FEATURES<br>1 PICKUP LOCATION |
| 11-20% | 2 MANUFACTURERS<br>2 GUARANTEED FEATURES<br>2 PICKUP LOCATION |
| 21-30% | 3 MANUFACTURERS<br>1 GUARANTEED FEATURE<br>2 PICKUP LOCATIONS |
| 30% OR MORE | 5 MANUFACTURERS<br>1 GUARANTEED FEATURE<br>5 PICKUP LOCATIONS<br>2 STATES OF PRODUCT |

FIG. 8

| PRODUCT CATEGORY: STANDARD TV ||||
|---|---|---|---|
| MANUFACTURER 902 | CURRENT INVENTORY 904 | FORECASTED CURRENT INVENTORY 906 | CURRENT/ FORECASTED 908 |
| SONY | 50 UNITS | 10 UNITS | 5.0 |
| MAGNAVOX | 20 UNITS | 40 UNITS | 0.5 |
| TOSHIBA | 20 UNITS | 20 UNITS | 1.0 |

| PRODUCT CATEGORY: STANDARD TV | | | | | | |
|---|---|---|---|---|---|---|
| PRODUCT IDENTIFIER 1002 | MANU-FACTURER 1004 | FEATURES 1006 | PICKUP LOCATIONS 1008 | PRODUCT STATES 1010 | MINIMUM ACCEPTABLE PRICE 1012 | RETAIL PRICE 1014 |
| P-1000 | MAGNAVOX | PIP | STAMFORD, TEANECK | NEW | $150 | $266 |
| P-1001 | SONY | 29", PIP, V-CHIP, 181 CHANNEL | MILTON, PROVIDENCE | NEW | $450 | $300 |
| P-1002 | TOSHIBA | PIP | HARTFORD | NEW, REFURBISHED | $200 | $350 |

FIG. 10

| PURCHASE TERMS IDENTIFIER 1102 | OFFER IDENTIFIER 1104 | GENERATED PURCHASE TERMS 1106 |
|---|---|---|
| PT-777333 | T-101555 | $200 |
| PT-555121 | T-555101 | SONY 31" |
| PT-333555 | T-654321 | $250 |

RETAIL SYSTEM FOR SELLING PRODUCTS BASED ON A FLEXIBLE PRODUCT DESCRIPTION

CROSS-REFERENCE TO RELATED APPLICATIONS

This application is a continuation of U.S. patent application Ser. No. 13/619,579, Filed Sep. 14, 2012 entitled "Retail System For Selling Products Based on A Flexible Product Description," which is a continuation of U.S. patent application Ser. No. 13/437,706, filed Apr. 2, 2012 entitled Retail System For Selling Products Based On A Flexible Product Description, which a continuation of U.S. patent application Ser. No. 11/746,714, filed May 10, 2007 entitled "Retail System For Selling Products Based On A Flexible Description," which is a divisional of U.S. patent application Ser. No. 09/540,035 filed Mar. 31, 2000 entitled "Retail System For Selling Products Based On A Flexible Description" (issued as U.S. Pat. No. 7,711,604), which claims the benefit of U.S. Provisional Patent Application No. 60/165,435, filed Nov. 15, 1999 entitled "Uniseller Internet Pricing".

U.S. patent application Ser. No. 09/540,035 is also a continuation-in-part for each of the following U.S. Patent Applications:

(i) U.S. patent application Ser. No. 08/889,503, filed Jul. 8, 1997 and issued as U.S. Pat. No. 6,249,772 on Jun. 19, 2001 entitled "Systems and Methods Wherein a Buyer Purchases a Product at a First Price and Acquires the Product from a Merchant that Offers the Product for Sale at a Second Price";

(ii) U.S. patent application Ser. No. 08/997,170, filed Dec. 22, 1997 and issued as U.S. Pat. No. 6,356,878 on Mar. 12, 2002 entitled "Conditional Purchase Offer Buyer Agency System";

(iii) U.S. patent application Ser. No. 09/220,191, filed Dec. 23, 1998 and issued as U.S. Pat. No. 7,386,508 on Jun. 10, 2008 entitled "Method and Apparatus for Facilitating a Transaction Between a Buyer and One Seller";

(iv) U.S. patent application Ser. No. 09/337,906, filed Jun. 22, 1999 and issued as U.S. Pat. No. 6,754,636 on Jun. 22, 2004 entitled "Purchasing Systems and Methods Wherein a Buyer Takes Possession at a Retailer of a Product Purchased Using a Communication Network";

(v) U.S. patent application Ser. No. 09/359,265, filed Jul. 22, 1999 entitled "System and Method for Facilitating and Managing the Sale of Customized Travel Product Restrictions"; and (vi) U.S. patent application Ser. No. 09/388,723, filed Sep. 2, 1999 and now abandoned entitled "Purchasing Systems and Methods Wherein a Buyer Takes Possession at a Retailer of a Product Purchased Using a Communication Network".

Each of the above-referenced applications, including U.S. patent application Ser. No. 13/619,579, U.S. patent application Ser. No. 13/437,706, U.S. patent application Ser. No. 11/746,714 (issued as U.S. Pat. No. 8,150,735), U.S. patent application Ser. No. 09/540,035 (issued as U.S. Pat. No. 7,711,604), U.S. Provisional Patent Application No. 60/165,435, U.S. patent application Ser. No. 08/889,503 (issued as U.S. Pat. No. 6,249,772), U.S. patent application Ser. No. 08/997,170 (issued as U.S. Pat. No. 6,356,878), U.S. patent application Ser. No. 09/220,191 (issued as U.S. Pat. No. 7,386,508), U.S. patent application Ser. No. 09/337,906 (issued as U.S. Pat. No. 6,754,636), U.S. patent application Ser. No. 09/359,265, and U.S. patent application Ser. No. 09/388,723, is incorporated by reference herein in its entirety.

FIELD OF THE INVENTION

The present invention relates to systems for selling products to customers. More specifically, the present invention relates to a system for selling a product to a customer based on a flexible product description provided by the customer.

BACKGROUND OF THE INVENTION

According to conventional retail pricing systems, a particular product is offered to all potential customers for a single price. Therefore, a conventional retailer endeavors to determine an "optimal" single price for a product that will generate more profit than any other single price.

Shortcomings exist even if a conventional retailer succeeds in determining an "optimal" price. Specifically, profit generated by sales at an "optimal" price will likely be less than a theoretical maximum profit, because some customers will be willing to pay more than the "optimal" price for the product. In this regard, the theoretical maximum profit is a profit resulting from charging each customer a maximum price he is willing to pay. Profit may also fall short of the theoretical maximum because no profit will be obtained from potential customers who are willing to pay more than the retailer's cost for the product but are unwilling to pay the "optimal" price. Due to these and other shortcomings, retailers have experimented with alternative pricing systems intended to generate a profit closer to the theoretical maximum.

Individualized bargaining is one such alternative system. In individualized bargaining, a retailer or a retailer's agent individually negotiates with each potential customer in an attempt to extract a highest price from each customer. However, associated transaction costs incurred by the retailer increase in proportion to the number of transactions. Accordingly, individualized bargaining is not desirable for retailers having more than a few customers, since the associated transaction costs would outweigh any resulting increase in profit from sales.

In view of the foregoing, what is needed is a pricing system for increasing a retailer's profit without incurring unacceptable transaction costs.

Improvements are also needed in other types of conventional pricing systems. For instance, conventional systems for discounting prices create several problems for retailers. According to these conventional systems, a retailer reduces a price of a product from an original price to a lower, discounted price to achieve some goal, such as reducing excess inventory of the product.

As described above with respect to retail pricing, some customers who buy the product for the discounted price may have been willing to buy the product for a higher price, and the retailer therefore loses potential profit. Individualized bargaining, as also described above, can be used to reduce these effects. However, in a vast majority of situations, individualized bargaining involves unacceptable transaction costs. Individualized bargaining also fails to address other problems caused by conventional discount pricing systems, such as price dilution and brand dilution.

Generally, price dilution describes a situation in which a reduction of a product's price decreases demand for the product at a higher price. In more detail, discounting a price of a product causes potential customers to believe that the discounted price is the "correct" price of the product, and therefore the customers become unwilling to accept any higher price for the product. Accordingly, conventional discount pricing systems can negatively affect future profits generated by a product.

Conventional discount pricing systems can also lead to brand dilution. Brand dilution refers to a reduction in the prestige of a brand in the minds of consumers. In this regard, conventional publicized price discounts for a product of a particular brand tend to reduce the amount of prestige that consumers attribute to the brand. Since brand prestige, or "goodwill", is a valuable asset vigorously protected by successful manufacturers (e.g., via trademark protection), these manufacturers are reluctant to allow retailers to discount prices for their products or to advertise the discounted prices. As a result, it is difficult for retailers to reduce excess inventory of these products.

Certain industries have attempted to address the foregoing deficiencies in conventional pricing systems. For example, the airline industry attempts to set prices for airline tickets based on speculated demand of individual customers. In this regard, each customer is categorized as a leisure traveler or a business traveler based on when a ticket is purchased. For example, a customer who buys a ticket for a flight more than twenty-one days before the flight is categorized as a leisure traveler and a customer who buys a ticket less than twenty-one days before the flight is categorized as a business traveler. Tickets for the flights are priced according to the categorization—lower prices for leisure travelers and higher prices for business travelers.

In view of the foregoing, two customers who submit identical itineraries to a travel agent may pay vastly different prices for tickets to identical flights, if the tickets are bought at different times. Such a result is perceived as unfair by customers. Moreover, a business traveler who purchases a ticket to a flight more than twenty-one days before a flight is categorized as a leisure traveler and therefore pays much less than she is willing to pay, resulting in lost revenue to the airline providing the flight. Accordingly, airline pricing fails to adequately address the deficiencies in conventional pricing systems.

Accordingly, what is also needed is a system for discounting prices which reduces price dilution and brand dilution, and which is perceived as fair to customers.

SUMMARY OF THE INVENTION

In consideration of the above needs, Applicants have discovered that customer demand for a product can be approximately quantified based on a customer's specification of desired product values. Applicants have also discovered that retailers are willing to reduce prices in return for customer flexibility in sale terms. In addition, Applicants have invented a system to use these discoveries to efficiently charge different prices to different customers in order to optimize profits while being fair to customers, and to discount prices while minimizing losses, price dilution, brand dilution and perceived unfairness.

The present invention addresses the foregoing by providing, in one aspect, a system in which a sale price is determined based on a product description, and the sale price is transmitted to a customer. In addition, no specific product is identified to the customer as a particular product that will be sold to the customer before an agreement to purchase a product for the sale price is received from the customer. Accordingly, the customer is not guaranteed what specific product will be purchased before an agreement to purchase a product for the sale price is received from the customer.

It should be understood that the customer will agree to the purchase if the customer is willing to accept, in return for the sale price, any product conforming to the product description. Both the customer and retailer benefit as a result of the foregoing system. The customer can receive lower prices in exchange for flexible description parameters and may also receive discounts that would normally not be advertised to the general public for fear of price and brand dilution. The retailer is able to evaluate a customer's individual demand based on the received description and determine a sale price accordingly, thereby reducing losses associated with the single-price systems described in the background. Although the inventive system may result in the sale of a product to two different customers for two different sale prices, the system is perceived as fair by both customers because a higher-paying customer likely agreed to a less flexible product description than a lower-paying customer, and neither customer would have agreed to the other's product description and sale price. The product descriptions received from customers also allow a retailer to determine what condition values are important to customers and to purchase and price regular inventory accordingly.

In addition, the foregoing features allow a retailer to mask product discounts. For example, a retailer may wish to reduce inventory of a product by selling the product at a discounted price. To mask the discount, the retailer chooses undesirable purchase terms under which to sell the product, such as pickup at a faraway location, even if the product is available at a closer location. As a result, the customer believes that the discount is attributable to the undesirable terms, rather than to the product quality or to decreased demand. Accordingly, price and brand dilution are minimized. In other embodiments, a product description is determined based on a sale price. According to some of these embodiments, a retailer receives a first sale price from a first customer, determines a first product description based on the first sale price, and transmits the first product description to the first customer. Similarly, the retailer receives a second sale price from a second customer which is lower than the first sale price, determines a second product description based on the second sale price, and transmits the second product description to the second customer. If a product exists which conforms to both the first product description and the second product description, the retailer may sell the product to the first customer for the first sale price and to the second customer for the second sale price. Even though the two customers pay different sale prices for the same product, the two customers will likely perceive the system as fair because each is agreeing to a different product description corresponding to their sale price. In this regard, the retailer may determine and transmit a broad product description based on the lower second sale price to give the second customer an impression that the product was sold for the second sale price only because the second customer agreed to a broad product description. This latter method is intended to mask any discount reflected by the lower sale price, thereby reducing perceived unfairness and allowing a retailer to sell a product at a discounted price while minimizing price and brand dilution.

The present invention also addresses the problems discussed above by providing, in one aspect, a system in which a product description is received and a product is selected, with a sale price of a particular selected product being a first sale price if the description is a first description and being a second sale price if the description is a second description.

The foregoing aspect provides a system by which a same product may be sold to different customers for different prices. Such pricing may be desirable if a product description received from one customer indicates a greater demand for a particular product than a product description received from another customer. It should be noted that, in contrast to the airline pricing systems discussed in the background, a system according to this aspect is perceived as fair because different product descriptions are received from each customer, and because each customer would likely not have been willing to purchase a product conforming to the other customer's description for the other customer's sale price.

With these and other advantages and features of the invention that will become hereinafter apparent, the nature of the invention may be more clearly understood by reference to the following detailed description of the invention, the appended claims and to the several drawings attached hereto.

BRIEF DESCRIPTION OF THE DRAWINGS

FIGS. 4A and 4B illustrate sample tables of the transaction database of FIG. 2;

FIG. 5 illustrates a sample table of the customer database of FIG. 2;

FIGS. 6A and 6B illustrate sample tables of the flexibility database of FIG. 2;

FIGS. 7A to 7D illustrate sample tables of the product pricing database of FIG. 2;

FIG. 8 illustrates a sample table of the product description database of FIG. 2;

FIG. 10 illustrates a sample table of the product database of FIG. 2;

FIG. 11 illustrates a sample table of the purchase terms database of FIG. 2;

DETAILED DESCRIPTION OF THE INVENTION

Figure 1:
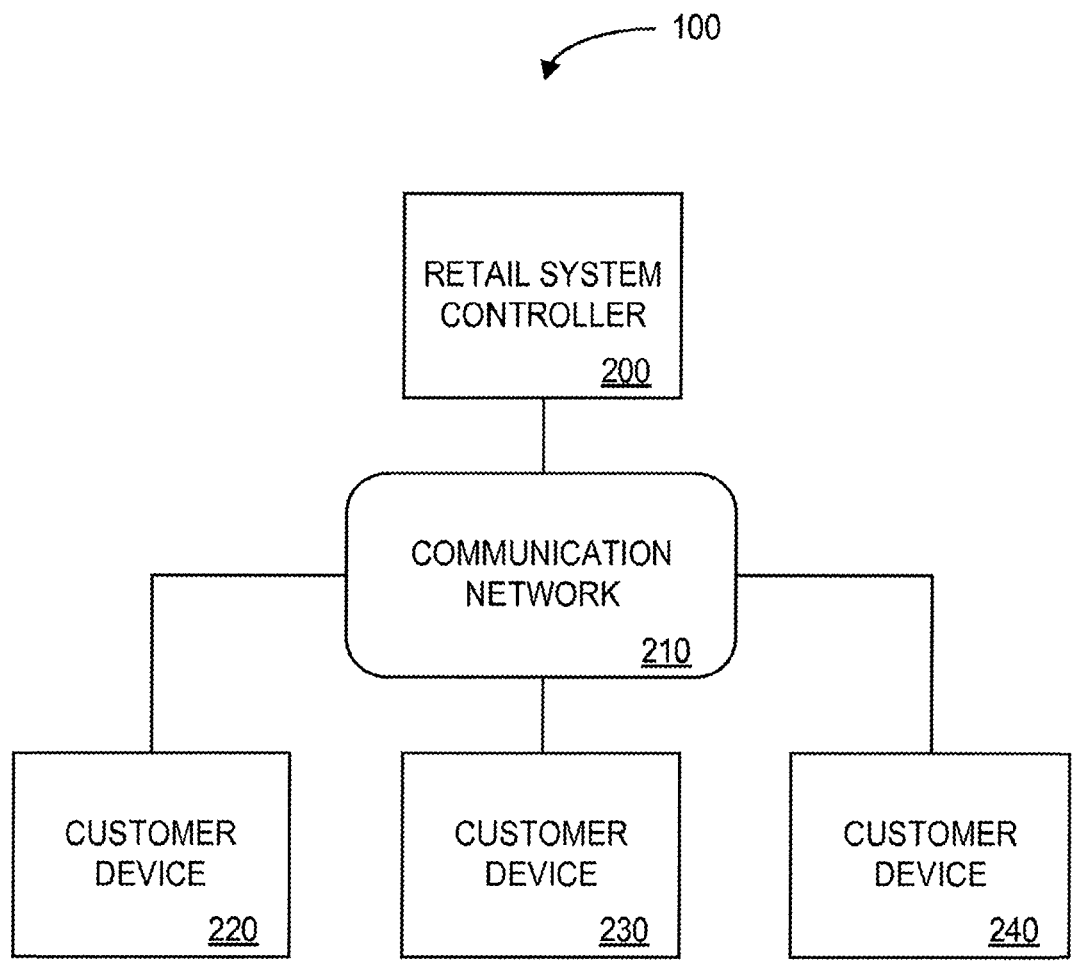
FIG. 1 is a block diagram of a retail system in accordance with one embodiment of the present invention.

To ensure clarity of the following detailed description, set forth below are definitions of terms used herein. The scope of the present invention is not to be deemed limited by the definitions.

Condition: a category of values which are descriptive of a product (see definition below) and/or a transaction. Examples include Manufacturer, Features, and Pickup Location.

Condition value: a specific value corresponding to a condition. Using the above examples of conditions, corresponding condition values may be "Sony", "27 in.", and "New York".

Conforming product: a specific product deemed to meet the requirements of a product description or a sale price.

Customer: any person, group of people, or other entity that patronizes a retailer (see definition below) and who purchases products from the retailer.

Mutually-exclusive condition: a condition, such as Manufacturer, for which a conforming product possesses only one condition value. In order for a product to conform to a product description, the product must include only one condition value for each mutually-exclusive condition in the product description. Therefore, when mutually exclusive condition values are added to a product description, a number of products conforming to the product description usually increases.

Mutually-inclusive condition: a condition, such as Features, for which a conforming product may contain more than one condition value. In order for a product to conform to a product description, the product must include each mutually-inclusive condition value in the product description. Therefore, when mutually-inclusive condition values are added to a product description, a number of products conforming to the product description usually decreases.

Product: a specific good or service, usually identified by a make and model number. Identical products sold by a retailer may be assigned an identical product identifier such as a Uniform Product Code ("UPC") or Stock Keeping Unit ("SKU"), while different products are usually assigned different product identifiers.

Product category: a classification of a product, or the general type of product a customer desires. Examples include Standard Television, Home Computer, and Airline Ticket.

Product description: a set of condition values that describes a product (see Product-specific condition) and may also describe a sales transaction (see Transaction-specific condition).

Product-specific condition: a condition relating to a product, e.g. Manufacturer, Features, etc. Contrast with Transaction-specific condition, defined below.

Purchase terms: Sale-related terms which are accepted by a customer. Purchase terms may comprise a product description, a sale price, and a retailer's agreement to sell a product conforming to the product description for the sale price.

Redemption information: Information specifying a specific product to be sold and information relating to the mechanics of a sales transaction, such as payment method, pickup location, and time of redemption.

Retailer: any person, group of persons, or entity that provides the sale of products to customers. Examples include a manufacturer, an online store, a traditional "brick-and-mortar" store, a sales broker, and an online "storefront" selling products offered by traditional stores, Retailer data: data accessible by or on behalf of a retailer which can be used to determine sale prices based on received product descriptions, product descriptions based on received sale prices, and/or whether to encourage sales of particular products. Retailer data may include sales data, inventory data, demand data or subsidy data.

Sale Price: a price for which a product is sold to a customer. A sale price according to the invention is often less than a retail price, which is a price for which a product is sold through conventional channels.

Transaction-specific condition: a condition relating to details of a sales transaction, e.g. Pickup Location, Pickup Date, Payment Method, etc.

System

FIG. 1 is a block diagram of a retail system in accordance with one aspect of the present invention. As shown, a retail system 100 according to embodiments of the present invention includes a retail system controller 200 that is in communication with customer devices 220, 230 and 240 through a communication network 210. The communication network 210 may be a Local Area Network or a Wide Area Network to which the controller 200 and the customer devices 220, 230 and 240 are connected. Other examples of networks usable in the present invention include a satellite-based network, a cellular network, an RF network, a telephone network, a cable television network, a bulletin-board system, or any other network for transferring data between locations. Also, even though the communication network 210 is illustrated as an intermediary between the retail system controller 200 and the customer devices 220, 230 and 240, it should be noted that direct connections may also exist between the controller 200 and the customer devices 220, 230 and 240.

In a case that communication network 210 is the World Wide Web ("Web"), the retail system controller 200 may include a Web server for receiving requests for Web pages (documents on the Web that typically include an HTML file and associated graphics and script files), for generating Web pages, and for transmitting Web pages over the Web. The Web server allows communication between the retail system controller 200 and the Web (communication network 210) in a manner known in the art.

Each of the customer devices 220, 230 and 240 may comprise computers, such as those based on the Intel® Pentium® processor, that are adapted to communicate with the controller 200 over the communication network 210. Each of the customer devices 220, 230 and 240 may also comprise a portable computer, a dedicated terminal, an Internet kiosk, a Personal Digital Assistant, a pager, a cellular phone, a pay phone, a video game console, an Automated Teller Machine, a slot machine, a watch, a vending machine, or any other device capable of receiving and transmitting data over the communication network 210. For example, in a case that the communication network 210 is the Web, each of the customer devices 220, 230 and 240 may execute a Web browser application for requesting, receiving, and reviewing Web pages. Any number of customer devices may be in communication with the communication network 210 and the controller 200.

Those skilled in the art will understand that devices in communication with each other need not be continually transmitting to each other. On the contrary, such devices need only transmit to each other as necessary, and may actually refrain from exchanging data most of the time. For example, a device in communication with another device via the Web may not transmit data to the other device for weeks at a time.

Devices

Figure 2:
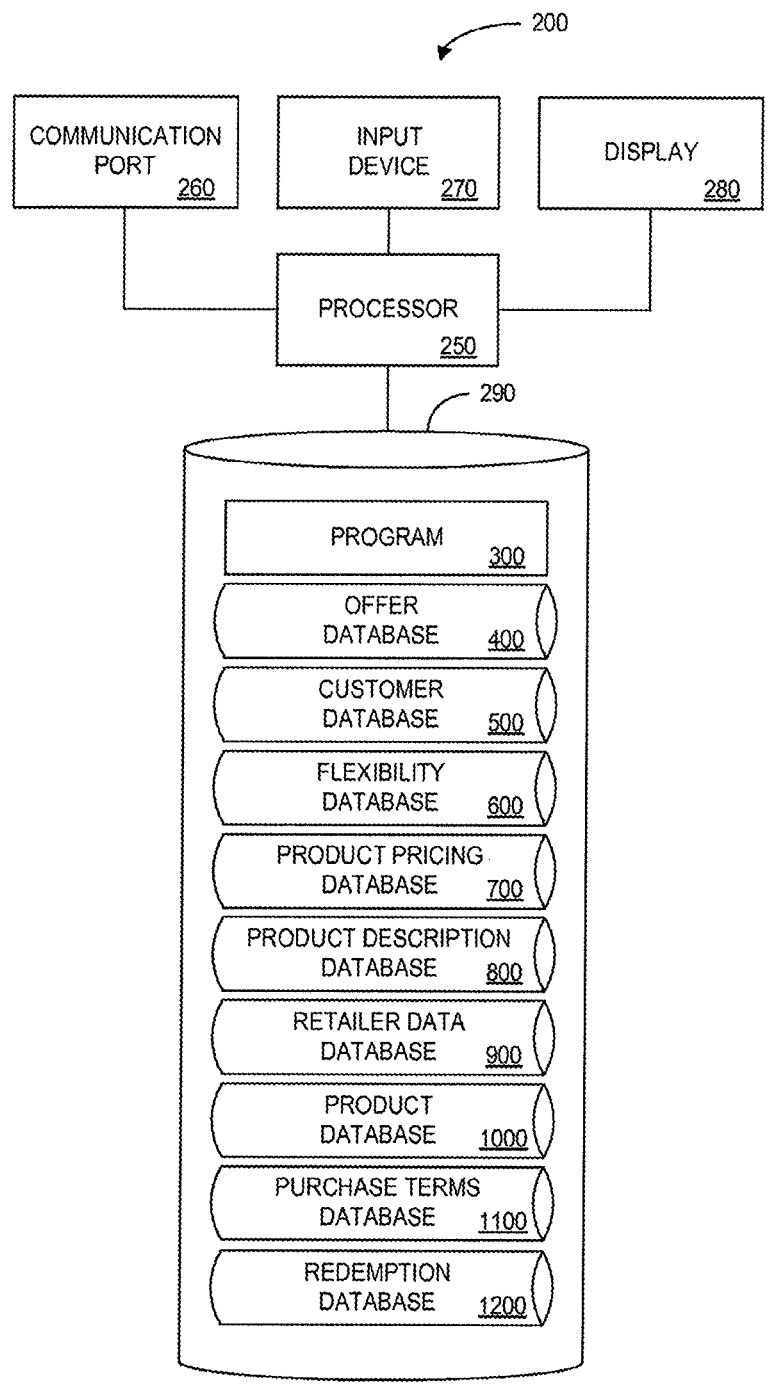
FIG. 2 is a block diagram of the retail system controller of FIG. 1.

FIG. 2 illustrates an embodiment of the controller 200. The controller 200 may be implemented as a system controller, a dedicated hardware circuit, an appropriately programmed general purpose computer, or any other equivalent electronic, mechanical or electro-mechanical device.

The controller 200 of FIG. 2 comprises a processor 250, such as one or more Intel® Pentium® processors. The processor 250 is coupled to a communication port 260 through which the controller 200 communicates with other devices, such as the customer devices 220, 230 and 240, through communication network 210. The controller 200 may also communicate with locally attached devices through the communication port 260. Accordingly, the communication port 260 may be adapted to communicate using protocols supported by the communication network 210 and the locally attached devices.

Also connected to the processor 250 are an input device 270 and a display 280. The input device 270 can be any device for inputting data, such as a keyboard, a touch screen, a mouse, a voice input device, an infrared port, or the like. The input device 270 can be used by a retailer to enter data for use by the controller 200 in accordance with the invention. Of course, data may also be input to the controller 200 by a retailer using a device connected directly to the controller 200 or to the communication network 210. The display 280 is used to display graphics and text and may be a CRT computer monitor, a flat-panel display or another display device.

The processor 250 is also in communication with a data storage device 290. The data storage device 290 is generally a data memory and may include any appropriate combination of magnetic, optical and/or semiconductor memory. The data storage device 290 may also include, for example, Random Access Memory (RAM), Read-Only Memory (ROM), a compact disc and/or a hard disk. Furthermore, the storage device 290 and the other elements of FIG. 2 may each be, for example: (i) located entirely within a single computer or other computing device; or (ii) connected to each other by a remote communication medium, such as a serial port cable, telephone line or radio frequency transceiver. In one embodiment, the controller 200 comprises one or more computers that are connected to a remote server computer for maintaining databases.

The data storage device 290 stores a program 300 of processor-executable process steps for basic operation of the controller 200. The processor 250 executes the process steps of the program 300 and thereby operates in accordance with the present invention, and particularly in accordance with the methods described in detail herein. The program 300 may be stored in a compressed, uncompiled and/or encrypted format. The process steps of the program 300 can be stored in the storage device 290 during manufacture of the storage device 290, can be downloaded from a compact disc or other computer-readable medium, or can be retrieved from a remote or local source via the communication port 260 in the form of a signal having the process steps encoded thereon.

The data storage device 290 also stores processor-executable process steps for basic operation of the controller 200, such as the process steps of an operating system, a database management system and "device drivers" for allowing the controller 200 to interface with computer peripheral devices. These latter process steps are known to those skilled in the art, and need not be described in detail herein.

According to one embodiment of the present invention, the steps of the program 300 are transferred from the data storage device 290 into a main memory, such as a RAM, and executed therefrom by the processor 250. In alternative embodiments, hard-wired circuitry may be used in place of, or in combination with, processor-executable software process steps for implementation of the processes of the present invention. Thus, embodiments of the present invention are not limited to any specific combination of hardware and software. Moreover, steps performed in accordance with the invention may be allocated between the controller 200 and the customer devices 220, 230 and 240.

The storage device 290 also stores (i) an offer database 400, (ii) a customer database 500; (iii) a flexibility database 600, (iv) a product pricing database 700, (v) a product description database 800, (vi) a retailer data database 900, (vii) a product database 1000, (viii) a purchase terms database 1100, and (ix) a redemption database 1200. The databases 400 to 1200 are described in detail below and depicted with sample entries in the accompanying figures. In this regard, and as will be understood by those skilled in the art, the schematic illustrations and accompanying descriptions of the databases presented herein are merely intended to demonstrate operable and preferred systems for associating and storing information. A number of other data structures may be employed besides those suggested by the tables shown. For example, rather than using database tables as described herein, the present invention may be implemented using only rules-based methods or a combination of database tables and rules-based methods. Similarly, the illustrated entries of the databases represent sample information only; those skilled in the art will understand that the number and content of the entries can be different from those illustrated herein.

Figure 3:
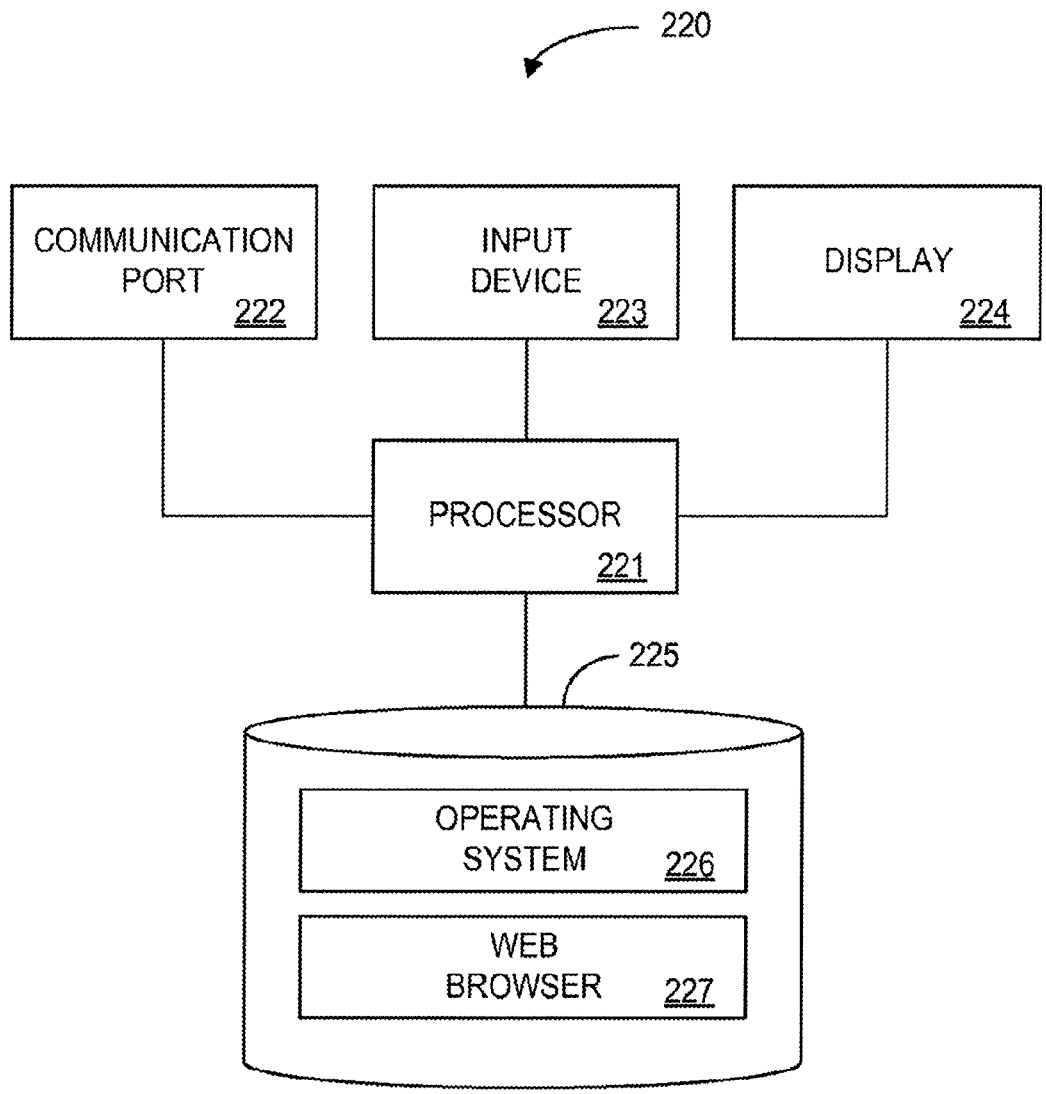
FIG. 3 is a block diagram of the customer device of FIG. 1.

FIG. 3 illustrates several elements of the customer device 220 according to one embodiment of the invention. In this embodiment, the customer device 220 is used to input data and instructions to the retail system controller 200, and to present data from the retail system controller 200 to a customer. As shown, the customer device 220 includes a processor 221, such as an Intel® Pentium® processor or the like, connected to a communication port 222. The communication port 222 transmits data to and receives data from external devices such as a printer, scanner, or the like, and therefore supports communication protocols used by the external devices. Also connected to the processor 221 is an input device 223 for receiving data from a customer and a display 224 for presenting data to the customer. The input device 223 and the display 224 can be any of the input devices or displays discussed above.

A storage device 225 is connected to the processor 221, and stores data and processor-executable process steps for the operation of the customer device 220. For example, the storage device 225 stores data and process steps of an operating system 226 which controls the operation of the customer device 220. Also stored in the storage device 225 are processor-executable process steps of a Web browser 227, which can be executed by the processor 221 to provide communication between a customer device 220 and the retail system controller 200 through the Web. Of course, depending on the nature of the connections between the customer device 220, the communication network 210, and the controller 200, other known applications or hardware may be needed for the customer device 220 to communicate with the retail system controller 200.

Databases

Offer Database

FIG. 4A illustrates a tabular representation of a portion of the offer database 400 according to one embodiment of the present invention. The offer database 400 stores data relating to offers submitted by customers to the retail system controller 200. The tabular representation includes a number of sample records each including details of an offer consisting of a customer-input product description. Those skilled in the art will understand that the database 400 may include any number of records. In the tabular representation shown, the database 400 includes fields associated with each of the records. The fields specify: (i) an offer identifier 402 that uniquely identifies a particular record; (ii) a customer identifier 404 that uniquely identifies the customer from whom a product description contained in the record was received; (iii) a Manufacturer 406 (if any) specified in the received product description; (iv) Features 408 (if any) specified in the received product description; (v) Pickup Locations 410 (if any) specified in the received product description; (vi) Product States (if any) 412 specified in the received product description; and (vii) an offer status 414 of an offer represented by the record. Usage of the data stored in the offer database 400 will be discussed in detail below.

FIG. 4B illustrates a tabular representation of the offer database 400 according to another embodiment of the present invention. In this embodiment, a customer initiates a transaction by submitting a sale price and is thereafter presented with a product description based on the sale price. The tabular representation includes several records, each of which represents a single offer and contains several fields. Specifically, each record contains the offer identifier 402, the customer identifier 404, and the status 414 as described above, as well as an offered price 416. The offered price 416 associated with a particular record is the sale price submitted by the customer to initiate the offer represented by the record. Operation of the embodiment reflected in FIG. 4B is described below in conjunction with FIGS. 18 and 19.

Customer Database

FIG. 5 illustrates a tabular representation of a portion of the customer database 500 stored in the storage device 290. The tabular representation includes a number of sample records and fields for each of the records. The fields specify: (i) a customer identifier 502; (ii) a customer name 504; customer contact information 506; and (iv) a payment identifier 508.

For each record in the customer database 500, the customer identifier 502 identifies a customer to whom data in the record correspond. In one embodiment, the customer identifier 502 serves as a link between the data in the databases used in the invention. For example, a customer identifier 404 in the offer database 400 identifies a same customer as an identical customer identifier 502 in the customer database 500.

The first name and last name of a customer are stored as the customer name 504, and contact information provided by the customer is stored as customer contact information 506. The contact information may include one or more of a street address, an e-mail address, a telephone number, a facsimile number, a pager number, or any other information using which a customer can be contacted.

The payment identifier 508 of a record includes information that can be used to charge a sale price to and/or extract payment from a customer. The tabular representation shown in FIG. 5 includes credit card numbers as example payment identifiers 508. In a case that a payment identifier 508 is used only to charge a sale price to a customer, the payment identifier 508 need not be maintained after the sale price has been charged. Accordingly, for security reasons, it may be desirable to delete the payment identifier 508 from the customer database 500 after a sale price has been charged to the customer and to substitute a payment identifier 508 such as "PAID".

Flexibility Database

Figure 6A:

FIG. 6A illustrates a tabular representation of a portion of the flexibility database 600 according to an embodiment in which a flexibility score is determined based on a product description and a sale price is determined based on the flexibility score. Specific details of the operation of this embodiment will be described in detail below.

The flexibility database 600 as shown in FIG. 6A includes data grouped according to a particular product category. For each product category, conditions 610 and corresponding flexibility points 620 are stored. Generally, and as will be described below, the flexibility database 600 is used to determine a flexibility score based on condition values in a product description. For example, using the tabular representation of FIG. 6A, each Manufacturer value specified in a product description adds ten points to a flexibility score. The points are added because each additional Manufacturer value in a product description may increase a number of conforming products that can be selected by a retailer, and therefore may increase a retailer's flexibility in selecting a product to sell. On the other hand, each Feature value in a product description reduces a flexibility score by five points, since each Feature value added to a product description likely reduces a number of conforming products. More generally, positive flexibility points 620 are associated with mutually-exclusive conditions 610 and negative flexibility points 620 are associated with mutually-inclusive conditions 610. It should be noted that the flexibility database 600 may include additional conditions 610 and corresponding flexibility points 620, as well as conditions 610 and corresponding flexibility points 620 for additional product categories.

FIG. 6B illustrates a tabular representation of a portion of the flexibility database 600 according to another embodiment of the invention. In this embodiment, a condition value 630 for a product category is associated with a number of flexibility points 640 and a weighting factor 650. A weighting factor 650 determines an effect that an associated condition value 630 has on a determined sale price, Usage of weighting factors 650 will be described below with respect to FIG. 14.

As described with respect to FIG. 6A, the data shown in FIG. 6B are used to determine a flexibility score of a product description, which in turn is used to determine a sale price. As also described, the flexibility database 600 of FIG. 6B may include additional condition values 620, flexibility points 640, and weighting factors 650 for the Standard TV product category and for additional product categories.

Product Pricing Database

Figure 7A:

Shown in FIG. 7A is a tabular representation of a portion of the product pricing database 700 according to one embodiment of the invention. As shown, the tabular representation includes several ranges of flexibility scores 710 and corresponding sale prices 720 for a particular product category. Since the ranges of flexibility scores 710 and corresponding sale prices 720 will likely vary across product categories, a portion of the product pricing database 700 such as that illustrated in FIG. 7A exists for each product category defined by a retailer, The product pricing database 700 according to this embodiment is used to determine a sale price based on a product description flexibility score. For example, after reception of a product description from a customer, a flexibility score is determined using a flexibility database 600 such as that described with respect to FIGS. 6A and 6B. Next, a score range 710 including the determined flexibility score is located in a portion of the product pricing database 700 corresponding to an appropriate category, and a sale price 720 corresponding to the located score range 710 is determined to be the sale price. A detailed description of this process is set forth below.

Figure 7B:

FIG. 7B illustrates a tabular representation of a portion of the product pricing database 700 according to another embodiment of the invention. In contrast to the product pricing database 700 as represented in FIG. 7A, the FIG. 7B representation includes percentage discount data 730 corresponding to each flexibility score range 710. F or a given flexibility score of a product description, corresponding percentage discount data 730 is determined using the product pricing database 700 of FIG. 7B and is applied to a specified price in order to determine a sale price. Specifics of this embodiment are also described below. It should be noted that the product pricing database 700 of FIG. 7B may include data for additional product categories.

A representation of a portion of the product pricing database 700 according to another embodiment is shown in FIG. 7C. The FIG. 7C representation includes, for a particular product, sale prices 740 corresponding to various ranges of flexibility scores 710. Of course, the product pricing database 700 of FIG. 7C may include data for other products. Usage of the product pricing database 700 according to FIG. 7C is described below. Generally, a conforming product is selected based on a received product description, a flexibility score corresponding to the product description is calculated, and data of the product pricing database 700 of FIG. 7C which corresponds to the selected product is used to determine a sale price. Accordingly, in contrast to the embodiments reflected in FIGS. 7A and 7B, products of a same product category may be priced differently in response to a single product description.

FIG. 7D illustrates a tabular representation of a portion of the product pricing database 700 according to yet another embodiment. According to this embodiment, which is described in detail below, a product description is evaluated based on predefined requirements to determine a percentage discount. The percentage discount is then used to determine a sale price.

The tabular representation shown in FIG. 7D includes data for a specific product category. A set of related condition 750, requirement 760, and percentage discount data 770 is stored for the specific category. Generally, each condition 750 is associated with any number of requirements 760, with each requirement corresponding to a percentage discount 770. For example, according to the first record in the illustrated table, a 0% discount corresponds to a product description including only one Manufacturer value. Of course, the product pricing database 700 as shown in FIG. 7D includes additional data for the Standard TV product category and data for other product categories.

Although the FIGS. 7A to 7D databases associated a greater flexibility with a higher flexibility score, it should be noted that a greater flexibility may be represented by a lower flexibility score. Of course, the discounts and/or prices associated with flexibility scores in the illustrated databases would be altered accordingly.

Product Description Database

FIG. 8 shows a tabular representation of a portion of the product description database 800 according to one embodiment of the present invention. The product description database 800 is used in embodiments in which a customer inputs a sale price and is presented with a corresponding product description. The product description database 800 may include additional data to that shown in FIG. 8 and data for additional product categories.

The tabular representation includes, for a product category, several ranges of product discounts 810 and description broadening rules 820 corresponding to each range. In one contemplated use, an input sale price is compared to an average retail price of an input product category in order to calculate a percentage discount reflected by the input sale price. Description broadening rules 820 corresponding to the percentage discount are identified and used to create a product description. For example, using the data shown in FIG. 8, if the received sale price reflects a fifteen percent discount off the average retail price, a product description is created specifying two manufacturers, two guaranteed features and two pickup locations. Advantages, variations and further details of the above process will be set forth in the following discussion.

The product description database 800 may also be used to determine a sale price based on a received product description. In this regard, a rule 820 most closely fitting an input product description is identified, and a discount 810 associated with the identified rule is applied to a specified price to determine a sale price corresponding to the product description.

Retailer Data Database

Figure 9A:
FIGS. 9A and 9B illustrate sample tables of the retailer database of FIG. 2.

FIG. 9A illustrates a tabular representation of a portion of the retailer data database 900 according to one embodiment of the invention. The illustrated portion stores information concerning products within a single product category. The tabular representation includes several records, each comprising several fields. The fields specify: (i) a manufacturer 902; (ii) current inventory 904; (iii) forecasted current inventory 906; and (iv) a current/forecasted inventory ratio 908.

The manufacturer 902 of a record indicates a product manufacturer, the current inventory 904 represents a number of products in current inventory produced by the manufacturer, and the forecasted current inventory 906 represents a forecasted current amount of inventory produced by the manufacturer. The current/forecasted ratio 908 for a particular record reflects the current inventory 904 of the record divided by the forecasted inventory 906, and is used in one embodiment, described in detail below, to determine weighting factors 650 of the flexibility database 600 as represented in FIG. 6B. It should be noted that additional retailer data for the Standard TV product category and for other product categories can be included in the retailer database 900.

Figure 9B:

Another tabular representation of a portion of the retailer data database 900 is illustrated in FIG. 9B. The data within the tabular representation are similar to that shown in FIG. 9A, except that instead of each record being directed to a particular manufacturer 902, each record is directed to a particular product identified by a product identifier 910. In an embodiment to be described below, current/forecasted ratios 908 of FIG. 9B are used to determine which of two conforming products should be selected by the retail system controller 200 to fill a customer-accepted offer. Of course, data for additional products may be contained in the retailer database 900 of FIG. 9B.

Product Database

A portion of the product database 1000 is represented in a tabular form in FIG. 10. Each record in the tabular representation represents one product, and comprises: (i) a product identifier 1002; (ii) a manufacturer 1004; (iii) features 1006; (iv) pickup locations 1008; (v) product states 1010; (vi) a minimum acceptable price 1012; and (vii) a retail price 1014.

For each record, the product identifier 1002 identifies a particular product available from a retailer. In one embodiment, the product identifier 1002 for a product is identical to a product identifier 910 used in the retailer data database 900 to identify the same product. The manufacturer 1004 identifies the manufacturer of the particular product, the features 1006 identify the features of the particular product, the pickup locations 1008 identify locations at which the product is available, and the product states 1010 identify physical states, such as new or used, in which the particular product is available. The minimum acceptable price 1012 indicates a minimum price at which the retail system controller 200 is permitted to sell the product, and the retail price 1014 specifies the price of the product when sold through conventional channels. Other types of data, as well as data for products other than those shown, may be included in the product database 1000.

Purchase Terms Database

FIG. 11 shows a tabular representation of the purchase terms database 1100 according to one embodiment of the invention. The data shown in FIG. 11 are sample data, and are not intended to reflect a complete database 1100. The tabular representation comprises several records, each of which includes (i) a purchase terms identifier 1102; (ii) an offer identifier 1104; and (iii) generated purchase terms 1106. The purchase terms identifier 1102 identifies a particular record in the database 1100. In other embodiments, the purchase terms database 1100 also includes a product identifier identifying a product to be sold to the customer. The offer identifier 1104 identifies a particular offer initiated by a customer-input product description or price, and can be used to reference related data associated with an identical offer identifier 402 from the offer database 400.

The generated purchase terms 1106 include terms generated by the retail system controller 200 and accepted by the customer. For example, in a case that a transaction was initiated by customer input of a product description, the generated purchase terms 1106 would include a corresponding sale price generated by the controller 200. On the other hand, if the transaction was initiated by customer input of a sale price, the generated purchase terms 1106 would include a generated product description.

Redemption Database

Figure 12:
FIG. 12 illustrates a sample table of a redemption database according to one embodiment of the invention.

FIG. 12 illustrates a portion of a tabular representation of the redemption database 1200. The redemption database 1200 includes several records containing associated fields. The fields specify: (i) a redemption identifier 1202; (ii) a purchase terms identifier 1204; (iii) a product identifier 1206; (iv) redemption information 1208; and (v) a redemption status 1210. Upon receiving a redemption identifier from a customer, the controller 200 locates an identical redemption identifier 1202 in the database 1200. A purchase terms identifier 1204 associated with the redemption identifier 1202 is then used to retrieve associated data from the purchase terms database 1100 needed to validate and process a redemption of the product identified by the product identifier 1206. The redemption information 1208 specifies details of a redemption such as transaction-specific condition values under which a redemption must take place, and the redemption status 1210 indicates a status of the redemption identified by the record.

Processes

I. Retailer Determines a Sale Price Based on a Product Description

Figure 13:
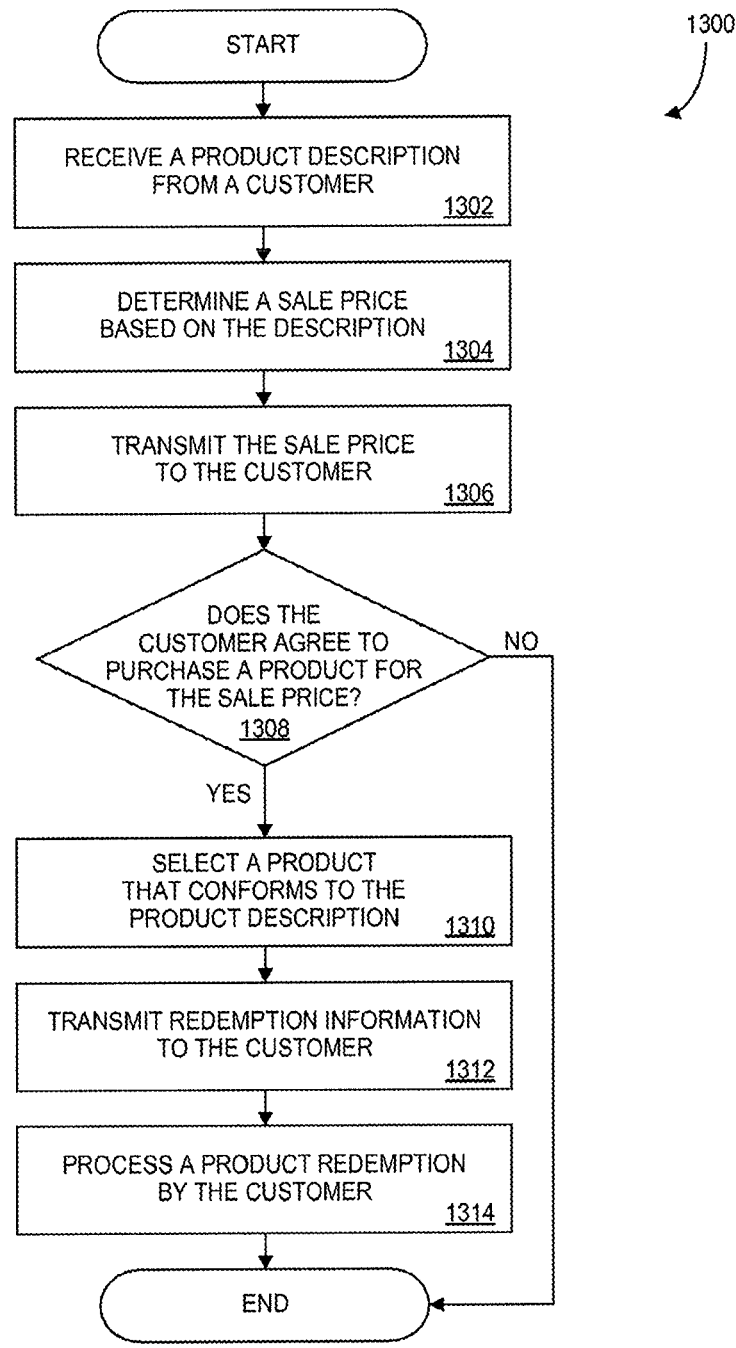
FIG. 13 is a flow diagram illustrating process steps of a sales transaction according to an embodiment in which a product description is received from a customer.

FIG. 13 illustrates a flow diagram 1300 of process steps for an embodiment of the present invention in which a customer inputs a product description and receives a sale price in response. In an embodiment where the controller 200 performs the process steps of FIG. 13, the process steps may be embodied in hardware within the controller 200, in processor-executable process steps stored on a computer-readable medium such as the storage device 290 and executed by the processor 250, in processor-executable process steps encoded in an electronic signal received by the controller 200 and executed by the processor 250, or in any combination thereof. It should be noted that each other flow diagram of process steps described herein may be similarly embodied. In addition, the particular arrangement of elements in the flow diagram 1300, as well as the other flow diagrams discussed herein, is not meant to imply a necessary order to the steps; embodiments of the present invention can be practiced in many different orders.

The FIG. 13 process steps begin at step 1302, in which a product description is received from a customer. In one embodiment, a product category is also received with the product description. The product description is a set of condition values describing a desired product. For example, the product description "Sony", "Magnavox", "Toshiba", "Picture-in-Picture", and "'New'", describes both a new twenty-seven inch Magnavox television with picture-in-picture as well as a new thirty-five inch Sony television with picture-in-picture, digital comb filter, V-chip, and surround sound features. It should be noted that a product description may also include limiting condition values, such as "27 in. to 35 in.".

In one embodiment, a customer inputs the product description prior to step 1302. For example, a customer using the customer device 220 selects the product category Standard Television and inputs the product description "Sony", "Magnavox", "Toshiba", "Picture-in-Picture", and "New" using the input device 223 and the display 224. In this regard, the interface provided by the customer device 220 for input of the product description may present retailer-defined conditions for which values are selected by the customer using well-known graphical user interface elements such as pull-down menus, check boxes, or radio buttons. Text-entry boxes may also be provided for customer entry of condition values. The product description may be input in any number of other ways depending on the nature of the customer device 220, such as by using voice recognition or character recognition, or from a computer-readable medium storing a product description. In another embodiment, the customer device 220 presents the customer with several product descriptions, and the customer inputs a product description prior to step 1302 by selecting one of the presented product descriptions. It should be noted that the customer device 220 used to input the product description may be located within a store operated by a retailer.

Returning to step 1302, the condition values of the received product description are stored in appropriate fields of the offer database 400 along with an offer identifier 402 generated to identify the present offer and a customer identifier 404 that identifies the customer. Also stored in association with the product description is a status 414 of "Pending System".

In step 1304, a sale price is determined based on the received product description. Several systems for determining the sale price are discussed below with respect to FIG. 14 and FIG. 15; these systems primarily use data stored in the flexibility database 600, the product pricing database 700, and the retailer data database 900. After the sale price is determined, the sale price is transmitted to the customer in step 1306. Accordingly, the associated status 414 is updated to "Pending Customer" to reflect that the system is awaiting acceptance or rejection of the sale price.

In one embodiment, the sale price is transmitted from the retail system controller 200 over the communication network 210 and back to the customer device 220 from which the product description was received in step 1302. After reception of the sale price, the customer device 220 displays the sale price to the customer using the display 224. Of course, in a case that the customer device 220 does not have a display 224, the sale price is communicated to the customer in some other manner, such as through a speaker or a printout. The sale price may also be transmitted to the customer in step 1306 using other known methods.

In another embodiment, the sale price transmitted in step 1306 is specified in terms of a discount amount, such as "25% off the retail price of the selected product", or "$50 off the retail price of the selected product".

Transmitted along with the sale price are other purchase terms which facilitate formation of a binding agreement between the customer and the retailer. The other purchase terms include, in one embodiment, the received product description and an offer from the retailer to sell a product conforming to the product description for the sale price. However, the controller 200 does not transmit, in step 1306, and before an agreement to purchase a product for the sale price is received, any information to the customer identifying a particular product to be sold to the customer upon completion of the transaction. The customer is also not guaranteed, before an agreement to purchase a product for the sale price is received, what specific product will be purchased. By avoiding transmission of this information, a retailer is provided with flexibility in selecting a product to sell after the customer is bound to the agreement. However, in another embodiment, specific details of two or more particular products are transmitted to the customer in step 1306 along with an indication that an unspecified one of the particular products will be sold to the customer upon receiving an agreement from the customer. This embodiment also provides the retailer with some flexibility in selecting a product to sell after the customer is bound.

It should be noted that a particular product conforming to the product description mayor may not be selected prior to step 1306.

After step 1306, it is determined in step 1308 whether or not the customer agrees to the sale price. In one embodiment, the customer is required to select an "I Agree" symbol displayed on the display 224 and the selection is transmitted to the retail system controller 200 via the communication network 210. Of course, other known systems for communicating an agreement can be used in step 1308. The customer may also be required to provide customer and payment information, such as a credit card number, so that the retailer is ensured of payment. The customer and payment information are stored in the customer database 500 along with an associated customer identifier 502. In other embodiments, the customer and payment information are received with the product description in step 1302, and a credit check/pre-authorization for the sale price is performed prior to transmission of the sale price in step 1306.

If it is determined in step 1308 that the customer does not agree to the sale price, the process steps of FIG. 13 terminate. In some embodiments, the customer can edit the product description rather than agree to the sale price, or the retail system controller 200 can suggest changes to the product description that would reduce the sale price. Once it is determined that the customer agrees to the sale price, flow continues to step 1310, In step 1310, a product is selected that conforms to the product description. One system for such selection is described below in conjunction with FIG. 16. After the conforming product is selected in step 1310, redemption information is transmitted to the customer in step 1312. In one embodiment, the redemption information includes specific details identifying the selected product and selected transaction-specific details such as pickup location and redemption time. The transaction-specific details may be selected so as to mask a discount reflected in the sale price, as will be described in detail with reference to FIG. 16, In another embodiment, the customer is not presented with information identifying the selected product until the product is redeemed. In this regard, the product may not even be selected until the customer attempts to redeem the product. The latter arrangement provides retailers with significant flexibility in choosing a product to sell and retailers may therefore significantly discount products redeemed in this manner.

The redemption information may be transmitted via the communication network 210 used to receive the product description or by another communication network. In a case that the product will be picked up by the customer at a retail location, also transmitted in step 1312 is a redemption identifier embodied in a paper voucher, a personal identification code, a frequent shopper card, or other record of purchase details. Similarly to step 1205, step 1312 may also be performed once a customer arrives at a retail location to pick up a product.

A product redemption is processed in step 1314. In one embodiment, a product redemption involves receiving a redemption identifier from a customer and presenting the customer with a corresponding product identified in the redemption database 1200. The retailer presented with the redemption identifier need not be in communication with the retail system controller 200. In this regard, the presented redemption identifier may represent, perhaps in encoded form, all the information needed for the redemption, such as the information shown in the redemption database 1200. In addition, there may be no need to process a product redemption in a case that the selected product is shipped to the customer. Details of product redemption will be discussed with respect to FIG. 17.

It should be noted that the foregoing process steps do not describe each embodiment of the invention. For example, a conforming product may be selected any time after a product description is received. In another embodiment, a customer is presented with suggestions to change a product description after the product description is received, in a case that no conforming product is available or for other reasons. Moreover, a sale price and alternative product descriptions may be transmitted in step 1306. The alternative product descriptions may be similar to the received product description but with different condition values. In this embodiment, it would be determined in step 1308 whether the customer agreed to the sale price and to what product description the customer agreed.

The customer and the retailer benefit as a result of the FIG. 13 process steps. Specifically, the customer can receive lower prices by providing flexible description parameters and may receive discounts that would not be given to the general public for fear of price and brand dilution. The retailer is able to evaluate a customer's individual demand based on the received description and determine a sale price accordingly, thereby reducing losses associated with conventional retail pricing systems. In embodiments where the retailer does not select the product to sell until well after the customer agreement, the retailer further benefits by being able to optimize the ordering of inventory based on outstanding offers. Although the process steps may result in a single product being sold for different sale prices, the system is perceived as fair because a higher-paying customer likely agreed to a different product description than a lower-paying customer, and neither would have agreed to the other's product description and sale price. The product descriptions received from customers also allow a retailer to determine what features are important to customers and to purchase and price inventory accordingly.

Figure 14:
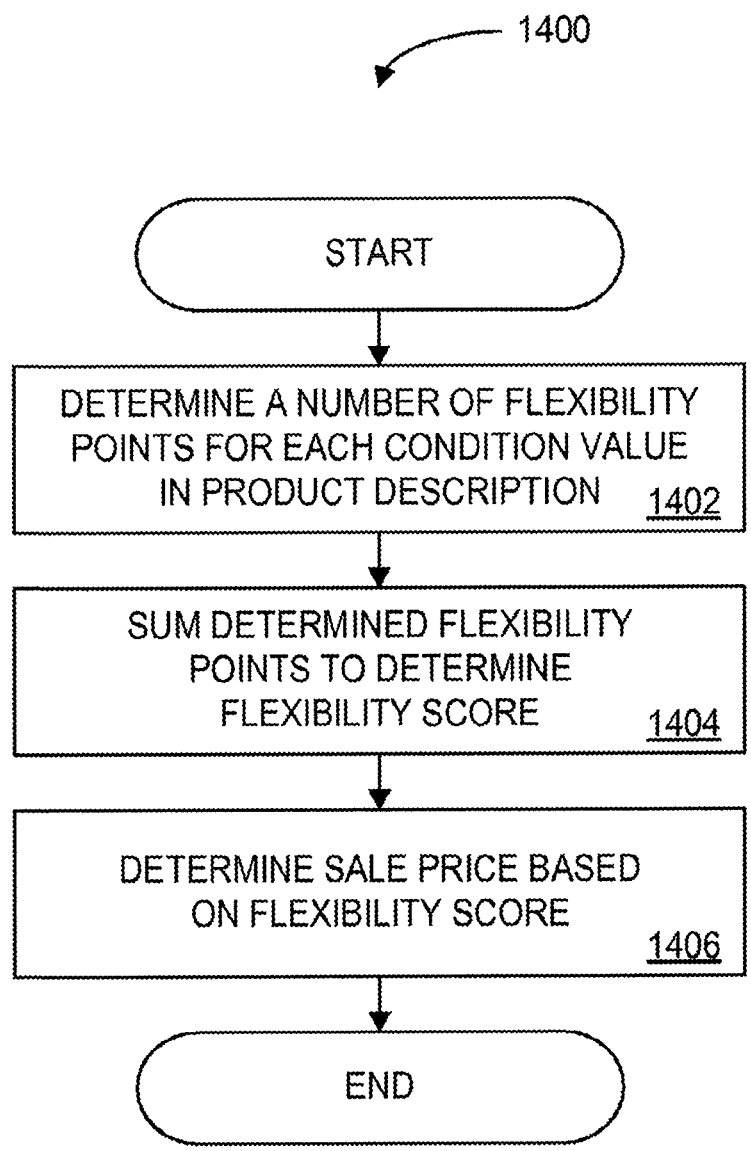
FIG. 14 is a flow diagram illustrating process steps to determine a sale price based on a product description according to one embodiment of the invention.

FIG. 14 illustrates a flow diagram 1400 of process steps that may be used in step 1304 of FIG. 13 to determine a sale price based on a received product description. The process steps begin at step 1402, in which a number of flexibility points is determined for each condition value in the received product description. The number of flexibility points is determined using the flexibility database 600 as represented in FIG. 6A. In operation, a condition value in the description is determined to correspond to a number of flexibility points 620 associated with the corresponding condition in the flexibility database 600. Next, in step 1404, the flexibility points corresponding to each condition value are summed to determine a flexibility score.

As an example of steps 1402 and 1404, a case is considered in which a flexibility score is determined for the product description "Sony", "Magnavox", "Toshiba", "V-chip", "stereo sound", and "Picture-in-Picture". According to the database 600 as represented in FIG. 6A, the condition values "Sony", "Magnavox" and "Toshiba" are determined to correspond to +10 flexibility points each, and the remaining feature values are determined to correspond to −5 flexibility points each. Accordingly, the flexibility score corresponding to the product description is fifteen (10+10+10−5−5−5=15).

According to another embodiment, steps 1402 and 1404 are performed using data shown in the flexibility database 600 of FIG. 6B. Flexibility scores are determined using the flexibility database 600 of FIG. 6B by multiplying, for each condition value 630, a corresponding number of flexibility points 640 with a corresponding weighting factor 650. Using the previous product description, the condition values "Sony", "Magnavox", "Toshiba", "V-chip", "stereo sound", and "Picture-in-Picture" would correspond to flexibility points (+10×5)=+50, (+10×0.5)=+5, (+10×1)=+10, (−5×1)=−5, (−5×4)=−20 and (−5×3)=−15, respectively. Accordingly, a flexibility score of 50+5+10−5−20−15=25 would be determined in step 1302.

As described above, a weighting factor 650 of the flexibility database 600 may reflect the desirability of a corresponding condition value in view of retailer data. For example, if a ratio 908 of current inventory 904 of a manufacturer 902 to forecasted inventory 906 of the manufacturer 902 in the retailer database 900 is 5, the retailer may wish to price the manufacturer's products so as to increase sales thereof. Accordingly, the retailer would like to associate a high flexibility score with received product descriptions including the desired manufacturer as a condition value. Therefore, a corresponding weighting factor 650 in the flexibility database 600 of FIG. 6B is set to 5. On the other hand, a current/forecasted ratio 908 of 0.5 indicates that a second manufacturer's products are selling better than expected. Since the retailer would likely prefer to continue selling these products without a discount, inclusion of the second manufacturer in a product description does not significantly increase the flexibility available to the retailer in selecting a product to sell. As a result, the weighting corresponding to the second manufacturer is set to 0.5 in the database 600 of FIG. 6B.

The embodiment of the flexibility database 600 illustrated in FIG. 6B thereby allows retailer data such as inventory, sales, demand and subsidies to be used in creating a flexibility score which more accurately reflects a flexibility and a desirability of a particular description. For example, manufacturers of certain products may offer subsidies to a retailer to promote sales of the products. Therefore, condition values 630 representing the subsidized products are associated with relatively large weighting factors 650 so that a product description to which a subsidized product conforms will likely produce a high flexibility score.

In one embodiment, weighting factors 650 are generated for each condition value in each product category, either manually or using ratios as shown in FIGS. 9A and 9B. It should also be noted that other retailer data can be used in determining weighting factors 650 corresponding to particular condition values. such as current sales v. forecasted sales, current sales lower than current demand, and current inventory higher than historical inventory. Moreover, the weighting factors 650 can be updated periodically or in "real time" by triggering off of changes made to the retailer data.

Returning to the flow diagram 1400, a sale price is determined in step 1406 based on the flexibility score by using the product pricing database 700. In the embodiment of the database 700 represented in FIG. 7 A, the previously-determined flexibility score of 25 corresponds to a sale price of $250, The corresponding sale prices 720 shown in FIG. 7 A can be derived in many ways. The prices 720 may be based on a range of previously-offered discount prices of products within the product category, on a range of percentage discounts off an average retail price of products in the category, on incremental price steps between the lowest and highest retail prices in the product category, or on any other data. It should be noted that the sale prices 720 in the product pricing database 700 are not necessarily related to a product which will be eventually sold to the customer.

Using the FIG. 7B embodiment of the database 700, the flexibility score of 25 corresponds to a 20% discount, and the sale price is determined in step 1406 by applying the percentage discount 730 to a retail price corresponding to the product category. The retail price to which the discount 730 is applied may be a retail price of a product already selected for sale to the customer, a retail price of another conforming product, an average retail price of conforming products, or another price. Again, the retail price is not necessarily related to the product which will be eventually sold to the customer.

In a case that a conforming product for sale is selected prior to determination of a sale price, data shown in FIG. 7C are used to determine the sale price in step 1406. As shown, the data associate a flexibility score 710 with a sale price 740 for a particular product. For example, in a case that product P-1000 was selected and a flexibility score of 25 was determined prior to step 1406, a sale price of $250 is determined using the data of FIG. 7C.

It should be noted that the databases 600, 700 as shown in FIG. 6A to FIG. 7B may be organized by specific product rather than by product category. In this case, a product is selected prior to step 1304 and entries of the databases 600, 700 corresponding to the selected product are used as described above to determine the sale price in step 1406.

Figure 15:
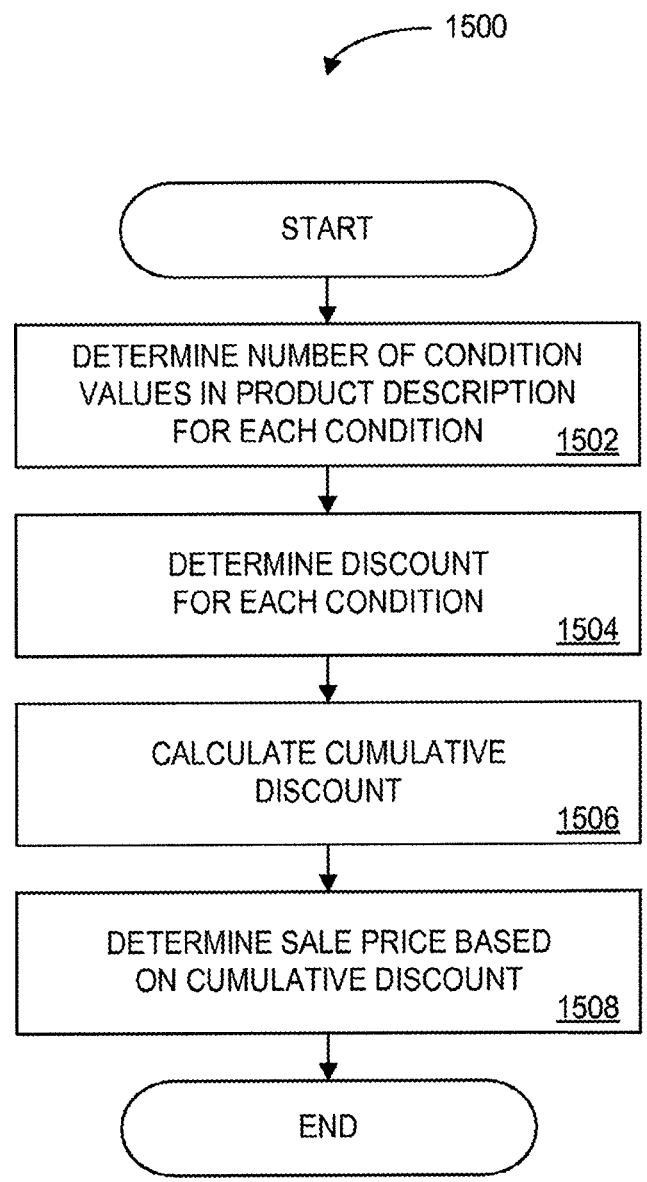
FIG. 15 is a flow diagram illustrating process steps to determine a sale price based on a product description according to one embodiment of the invention.

FIG. 15 illustrates a flow diagram 1500 of process steps to determine a sale price based on a product description (step 1304) according to another embodiment of the invention. The process begins at step 1502, in which the retail system controller 200 determines a number of condition values specified in the product description for each condition. Next, in step 1504, a discount is determined for each condition using the product pricing database 700 as illustrated in FIG. 7D. Specifically, for each condition 750, an appropriate requirement 760 is identified and a percentage discount 770 associated with the requirement is determined. For example, in a case that a product description includes three manufacturer values and two features, percentage discounts of 10% and 5% are determined in step 1504.

In step 1506, a cumulative discount corresponding to the product description is calculated by summing the determined percentage discounts. In the previous example, the cumulative discount is 15%. Next, in step 1508, the sale price is determined by discounting a particular retail price by the cumulative discount. The particular retail price may be a retail price of a specific conforming product, an average retail price of the subject product category, or any other price.

It should be noted that the percentage discounts 770 stored in the product pricing database 700 of FIG. 7D may be condition value-specific as described with respect to FIG. 6B. In this case, the requirements 770 would include particular condition values, and discounts, either weighted or unweighted, would be associated with each value. As also described with respect to FIGS. 6A to 7B, the product pricing database 700 of FIG. 7D may be organized by specific product rather than by product category. In this case, a product is selected prior to step 1304 and entries of the database 700 corresponding to the selected product are used as described above to determine the sale price in step 1508.

In another embodiment of step 1304, the retail system controller 200 stores product descriptions and associated sale prices. Accordingly, in this embodiment, a stored product description most similar to the received product description is identified and a sale price is determined to be equal to a sale price associated with the stored product description. Still other methods for determining a sale price based on a product description will be apparent to those of ordinary skill in the art.

Figure 16:
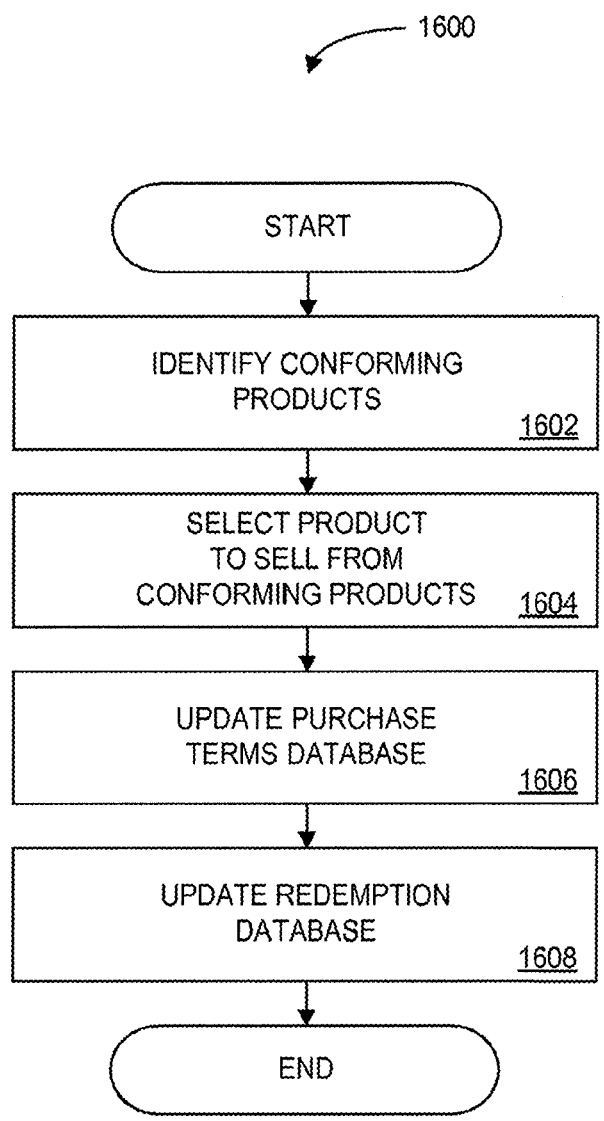
FIG. 16 is a flow diagram illustrating process steps to select a product conforming to a product description according to one embodiment of the present invention.

FIG. 16 illustrates a detailed flow diagram 1600 of process steps to select a product that conforms to a product description according to step 1310 of FIG. 13. Initially, at step 1602, the product database 1000 is searched to identify products that conform to the product description received in step 1302. When searching the database 1000, it is not necessary to consider products having a minimum acceptable price 1012 greater than the sale price determined in step 1304.

In step 1604, a product to sell is selected from the identified conforming products. In one embodiment, transaction-specific condition values conforming to the product description are also selected in step 1604. The selection of a product and of condition values can be based on many different factors. For example, a product may be selected that optimizes profit, inventory, sales, demand, subsidies. or any other variable. In this regard, a product having excess inventory may be selected for sale even though the determined sale price reflects a substantial discount off the retail price.

A retailer may be more likely to sell a product at a discount in a case that the received product description includes an undesirable transaction-specific condition value, such as pickup at an inconvenient location, because the undesirable value can be used to mask the discount. In other words, although the product may be available at a more convenient location, the retailer can select to sell the product at the inconvenient location specified in the product description. The customer will therefore tend to feel like the discount was earned, and other customers paying more for the product but picking up the product at a convenient location will feel fairly treated. Moreover, price and brand dilution can be minimized because the discount will be attributed to the details of the transaction rather than to the product.

Many other transaction-specific conditions can be used to justify and/or mask a product discount, such as Time of Redemption and Product State. The Time of Redemption condition specifies a time period during which the customer is willing to wait before redeeming the product. In a case that a customer has specified a Time of Redemption value such as three months, the retail system controller 200 can use the customer's willingness to wait for the product as an apparent reason for offering a large price discount. Moreover, the retailer may be willing to discount a price of a product in exchange for future demand guaranteed by the three month condition value, because the retailer will be able to reorder inventory tailored to the future demand or to select a particular product in step 1310 that hasn't sold well through conventional channels.

The Product State condition may have values such as "new", "used", "refurbished", "demo", or the like. These values are useful because a retailer may want to discount a non-new product to dispose of products that aren't selling and that cannot be returned to the manufacturer. The non-new condition values may also be used to justify a discount in an attempt to minimize price dilution, brand dilution, and perceived unfairness.

A retailer may have other reasons for selecting a particular product and particular transaction-specific condition values. For example, if a new or remote pickup location is specified in a product description along with other locations, a retailer may choose to select a product to be picked up at the specified location simply to increase customer traffic at the new or remote location.

In step 1606, the purchase terms database 1100 is updated. The database 1100 is updated by creating a purchase terms identifier 1102 corresponding to the current offer identifier 1104 and by storing the generated purchase terms 1106 in conjunction with the created purchase terms identifier 1102. Next, in step 1608, the redemption database 1200 is updated by generating a redemption identifier 1202 and associating the purchase terms identifier 1204, a product identifier 1206 identifying the selected product (if any), and any transaction-specific redemption information 1208 therewith. Also associated therewith is a redemption status 1210.

Figure 17:
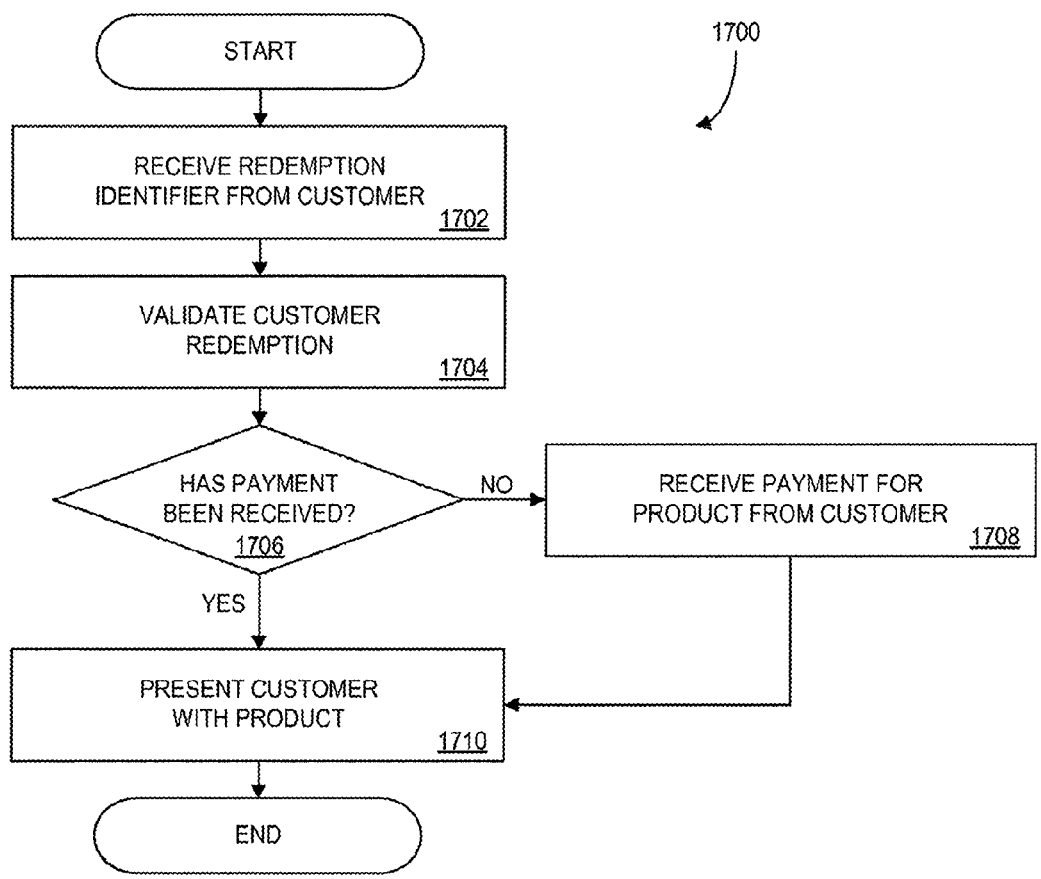
FIG. 17 is a flow diagram illustrating process steps to process a product redemption according to one embodiment of the present invention.

FIG. 17 illustrates a flow diagram 1700 of process steps to process a customer redemption of the selected product according to one embodiment of step 1314 of FIG. 13. The process begins at step 1702, wherein a redemption identifier is received from the customer. The redemption identifier may be embodied in a voucher, a personal identification code, or the like transmitted to the customer in step 1312. The redemption may occur at a retail store or, in a case that the product will be shipped to the customer, may be initiated by transmission of the redemption identifier from a customer device 220 to the retail system controller 200. In a case that redemption information 1208 associated with a record indicates that a redemption must occur at a future time, a retailer may send a reminder to an associated customer that the future time is approaching.

In step 1704, the redemption is analyzed to validate whether all requirements for the transaction are satisfied. According to one embodiment of step 1704, the received redemption identifier is used to locate a corresponding record in the redemption database 1200 and, specifically, to locate redemption information 1208 associated with the redemption identifier. The current redemption is then analyzed in step 1704 to determine whether the current redemption satisfies the details of the redemption information 1208. For example, it is determined in step 1704 whether the customer is picking up the product at the location and time specified in the redemption information 1208, if any. In other embodiments, the received redemption identifier encodes redemption information such as the redemption information 1208 and the redemption identifier is decoded to retrieve the information used in step 1704.

It is then determined, in step 1706, whether a payment has been received from the customer. In one embodiment, this determination is made by referring to the redemption status 1210 of the corresponding record in the redemption database 1200. If payment has not been received from the customer, flow proceeds from step 1706 to step 1708 to receive payment from the customer. The payment may be in any form acceptable to the retailer, such as cash, check, credit card, debit card, or the like. In a case that the redemption is not conducted in-person, it may be easiest to receive payment by credit card. In some embodiments, payment is guaranteed with payment information in conjunction with customer acceptance of a received sale price. In this regard, the customer may be charged a penalty if he does not attempt redemption.

If the payment has been received, the customer is presented, in step 1710, with the product identified by the product identifier 1206 of the corresponding record. If the corresponding record does not include a product identifier 1206, the product is also selected in step 1710. The presentation may include handing the product to the customer or shipping the product to the customer. In this regard, the product may be a software-based product which is shipped to the customer by encoding the product in an electrical signal and sending the signal to a customer device 220 over the communication network 210 using an appropriate transmission protocol.

II. Retailer Determines a Product Description Based on a Sale Price

Figure 18:
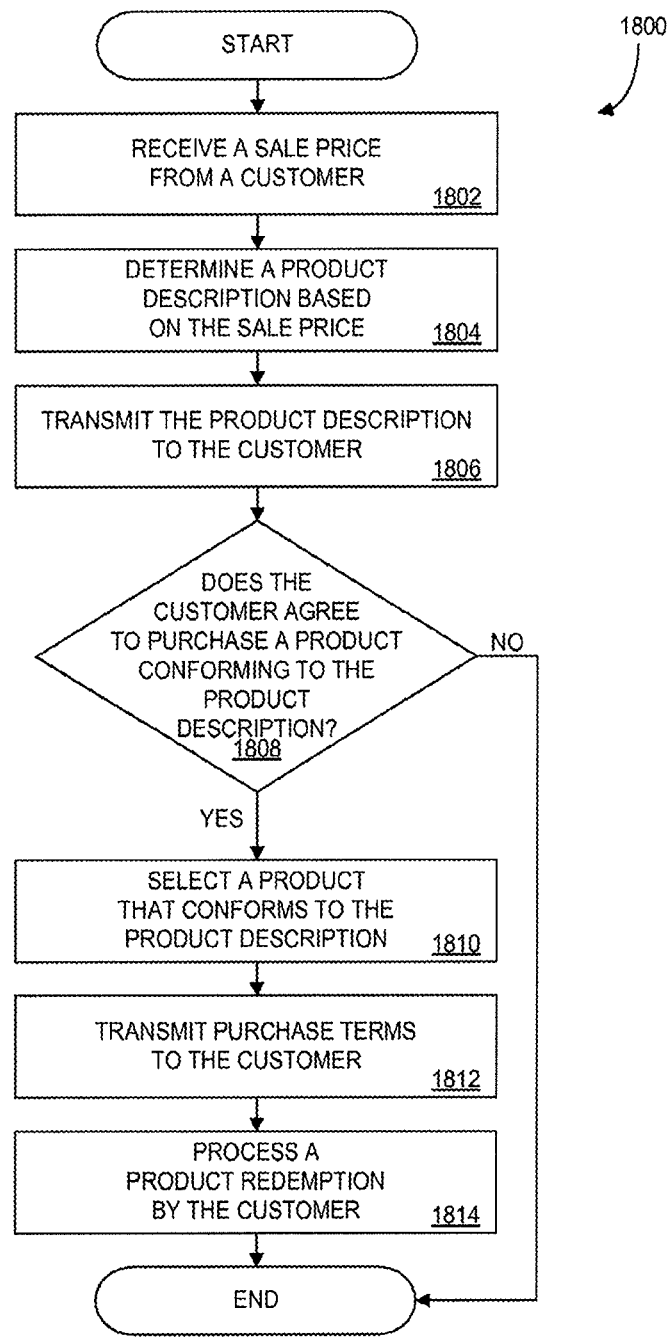
FIG. 18 is a flow diagram illustrating process steps of a sales transaction according to an embodiment in which a sale price is received from a customer.

FIG. 18 illustrates a flow diagram 1800 of process steps of a sales transaction according to another embodiment of the present invention. Generally, the process steps differ from those illustrated in FIG. 13 in that a sale price is received from a customer and a product description is determined based on the sale price.

In more detail, a sale price is received from a customer at step 1802. The sale price may be received in any known manner, including those specified above with respect to step 1302 of FIG. 13. In alternative embodiments, the sale price received in step 1802 is in the form of a range of sale prices, a percentage discount off a retail price, or a discount amount off a retail price. A product category may also be received along with the sale price. For example, the data "$200" and "Standard Television" may be received in step 1802. The received sale price may also be specified in terms of a discount, such as "$10 less than retail price" or "20% off retail price", or a range of values, such as "$400 to $425". In one embodiment, the received sale price is stored in the offered price field 416 of the offer database 400 in association with an offer identifier 402 created to represent the current offer.

Next, in step 1804, a product description is determined based on the received sale price. In one embodiment, a database may be used which contains, for each product category, several ranges of sale prices and a product description corresponding to each range. In this embodiment, step 1804 is performed simply by identifying the range of prices in which the received sale price falls and obtaining the corresponding product description. In a variation of this embodiment, several descriptions may correspond to each range of sale prices.

In another embodiment, the product description database 800 is used in step 1804 to identify a rule 802 corresponding to the received sale price. A product description is created based on the corresponding rule 802, with the condition values of the product description identifying related or similar values. For example, if the rule 802 calls for three manufacturers, three low-end or three high-end manufacturers may be included in the created product description. Details of another embodiment of step 1804 will be described in conjunction with FIG. 19.

After step 1804, the product description is transmitted to a customer in step 1806. The transmission can be performed using one of the methods discussed with respect to step 1306, or using other known methods. In one embodiment, the product description is transmitted with purchase terms which, along with a customer's agreement to the product description, creates a binding contract to purchase a product. The purchase terms may include the received sale price, the product description, and an offer from the retailer to sell a product conforming to the product description for the sale price. In another embodiment, the controller 200 does not transmit, in step 1806, any information to the customer identifying a particular product to be sold to the customer before an agreement to purchase a product conforming to the product description is received. The controller 200 also does not guarantee to the customer, before an agreement to purchase a product conforming to the product description is received, what specific product will be purchased. By avoiding transmission of this information, a retailer is provided with flexibility in selecting a product to sell after the customer is bound to the sale.

Alternatively, two or more particular products are identified to the customer in step 1806 along with an indication that an unspecified one of the particular products will be sold to the customer upon receiving an agreement from the customer. This embodiment also provides the retailer with some flexibility in selecting a product to sell after the customer is bound.

Next, in step 1808, it is determined whether the customer agrees to purchase a product conforming to the product description for the sale price. Similar mechanisms to those described in conjunction with step 1308 can be used to determine whether the customer has made such an agreement. If the customer does not agree, the FIG. 18 process steps terminate. The customer may have an opportunity to resubmit the sale price in hopes of receiving another product description, or the customer may have the option of submitting a new sale price. If the customer agrees, flow proceeds to step 1810. Steps 1810 to 1814 proceed similarly to steps 1310 to 1314 and detailed descriptions thereof are omitted for the sake of brevity.

According to the FIG. 18 process steps, the retailer may sell a same product to two customers for two different sale prices. However, the two customers will likely perceive the system as fair because each is agreeing to a different sale price and product description. In addition, the retailer may determine a broad product description based on the lower sale price to give an impression that the lower sale price is available only because the lower-paying customer agrees to a broad product description. This method masks any discount reflected in the lower sale price, reduces perceived unfairness and allows a retailer to sell a product at a discounted price while minimizing price and brand dilution.

Figure 19:
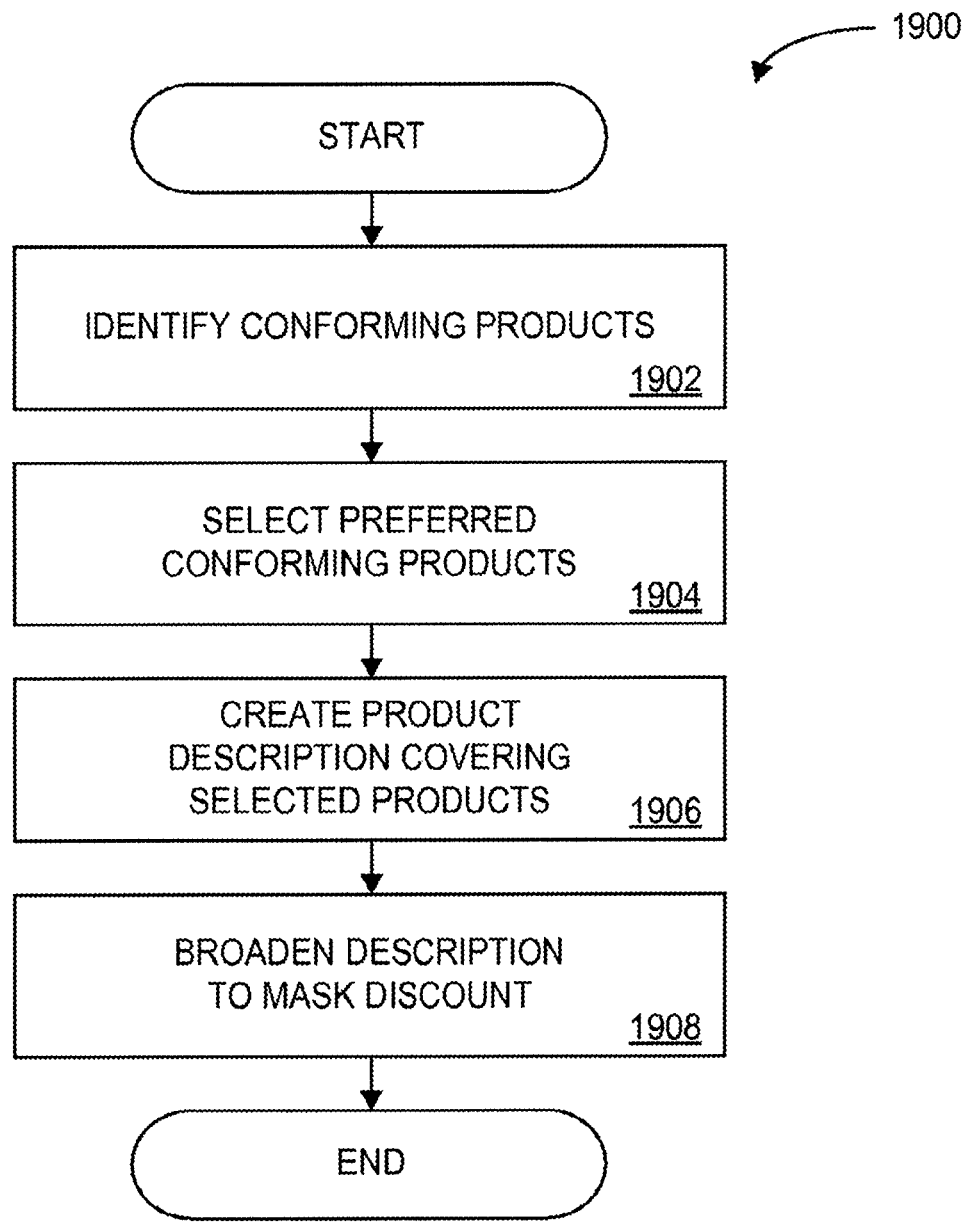
FIG. 19 is a flow diagram illustrating process steps to determine a product description based on a sale price according to one embodiment of the invention.

FIG. 19 illustrates a flow diagram 1900 of process steps according to one embodiment of step 1804. The process steps can be used to determine a product description based on a received sale price.

First, products which conform to the sale price received in step 1802 are identified by referring to the minimum acceptable prices 1012 of the product database 1000. Specifically, for each product of a product category received in step 1802, an associated minimum acceptable price 1012 is compared with the received sale price. The products having an associated minimum acceptable price 1012 less than the received sale price are identified as conforming products in step 1902. For example, if the received sale price is $300, products P-1000 and P-1002 of FIG. 10 are identified as conforming products.

In step 1904, products for which discounts are preferred are selected from the identified conforming products. In one embodiment, only those conforming products that are selling more slowly than forecasted are selected in step 1904. These slow-selling products can be identified from the retailer database 900 as those having a current/forecasted ratio 908 of less than unity. In the present example, the product having an identifier 910 P-1000 is selected as a product for which discounts are preferred. It should be noted that more than one product may be selected in step 1904.

Of course, other methods may be used and other retailer data considered when selecting preferred products to discount in step 1904. For example, it may be preferable to determine a desired price for each identified conforming product and to select only those products for which the desired price is less than the received sale price.

In step 1906, a product description is created which covers the products selected in step 1904. In one embodiment, the created product description includes all mutually-exclusive condition values present in each selected product. In addition, the product description includes only those mutually-inclusive conditions present in all selected products. Using these guidelines and the data representing product identifiers 1002 P-1000 and P-1002 in the product database 1000, a product description is created including the mutually-exclusive condition values "Magnavox", "Toshiba", "Stamford", "Hartford", "Teaneck", "New", and "Refurbished", and the mutually-inclusive condition value "Picture-in-Picture".

In step 1908, the created product description is broadened in order to mask any discount that may result from the sale of a product at the sale price. In general, the description is broadened by removing condition values for mutually-inclusive conditions and by adding condition values for mutually-exclusive conditions. By broadening the product description, any discount will appear to be due to the customer's willingness to accept the uncertainty presented by a flexible product description.

In one embodiment of step 1908, the description is broadened based on a percentage discount off a retail price reflected by the sale price. The retail price may be a retail price of a particular product to be sold to the customer, in a case that the particular product has been selected, an average retail price of the products selected in step 1802, or another retail price. As shown in the FIG. 8 representation of the product description database 800, ranges of percentage discounts 810 and associated description broadening rules 820 are established for a product category. In operation, a percentage discount is calculated, a corresponding range 810 is located in the product description database 800, and description broadening rules 820 associated with the range are identified. It is then ensured that the description created in step 1804 is at least as broad as specified in the identified rules. If not, condition values are added (for mutually-exclusive conditions) and/or removed (for mutually-inclusive conditions).

In another embodiment of step 1908, the product description database 800 is organized by product rather than by product category. Accordingly, a product is selected to sell prior to step 1908, a percentage discount reflected by the sale price is calculated, and data in the database 800 corresponding to the product is accessed to identify appropriate description broadening rules 820 corresponding to the percentage discount 810.

The description may also be broadened in step 1908 to include mutually-exclusive condition values normally possessed by expensive products in order to encourage the customer to agree to the product description. On the other hand, the product description may be broadened to describe lower-quality items in order to give a customer agreeing to the product description a pleasant surprise when the customer learns that the product to be purchased is a better-quality product.

III. Retailer Transmits Product Description and Sale Price

Figure 20:
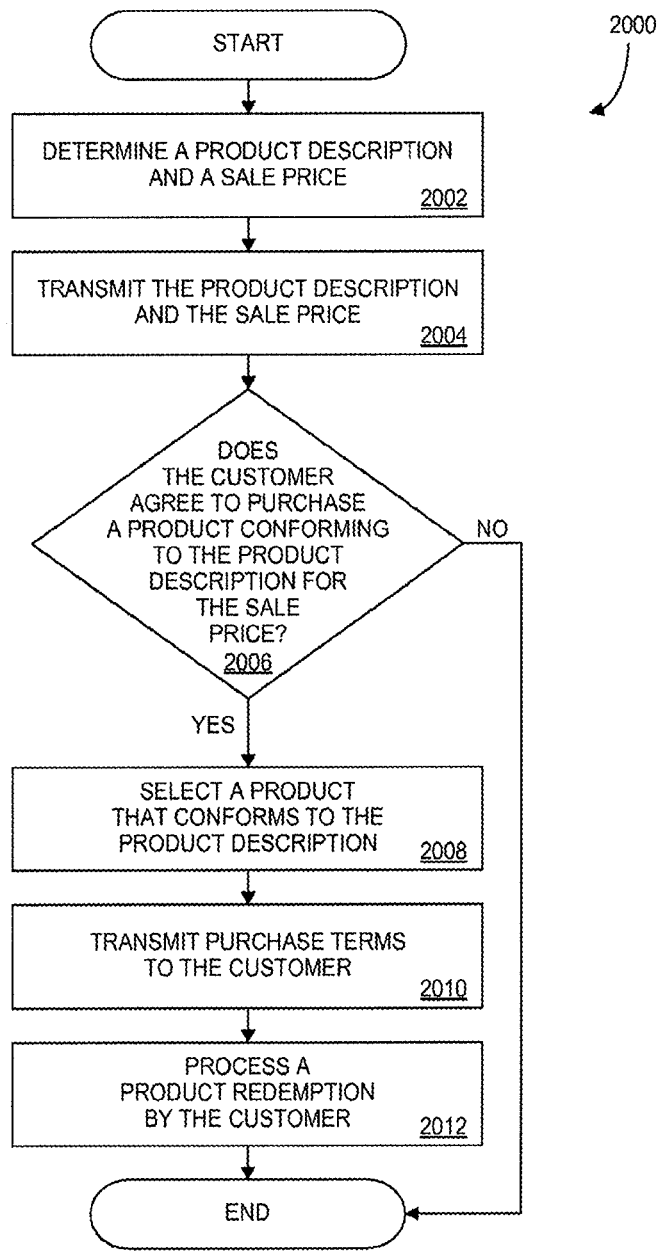
FIG. 20 is a flow diagram illustrating process steps of a sales transaction according to an embodiment in which a product description and a sale price are transmitted to a customer.

FIG. 20 illustrates a flow diagram 2000 of process steps of a sales transaction according to yet another embodiment of the invention. The process steps are used to determine a product description and a sale price and to transmit the product description and the sale price to a customer.

Specifically, a product description and a sale price are determined in step 2002. In one embodiment, step 2002 occurs in response to customer input of a product category. The product description may be determined in step 2002 based on a manual entry or using an automated analysis of retailer data, with the sale price being determined based on the product description using any of the methods described above. Alternatively, the sale price can be determined based on a manual entry or using an automated analysis, with the product description being determined based on the sale price as described above or by using other methods.

Next, in step 2004, the product description and sale price are transmitted to a customer device 220 from which the product description and sale price can be presented to customers. For example, the product description and the sale price may be transmitted to a publicly-located kiosk or ATM machine, where they can be presented to customers approaching the kiosk or ATM machine for information or banking services. Alternatively, a retail store can include such kiosks for display of information and special deals to browsing customers. In addition, the product description and the sale price may be transmitted to electronic price tags and presented to customers thereby.

In one embodiment, the product description and the sale price are transmitted along with information to facilitate formation of a binding agreement between the customer and the retailer. The information may include the product description, the sale price and an offer from the retailer to sell a product conforming to the product description for the sale price. It is contemplated to avoid transmitting, before receiving an agreement to purchase a product conforming to the product description for the sale price, any information to the customer identifying a particular product to be sold to the customer upon completion of the transaction. It is also contemplated to avoid guaranteeing to the customer, before receiving an agreement to purchase a product conforming to the product description for the sale price, what specific product will be purchased. By avoiding transmission of this information, a retailer is provided with flexibility in selecting a product to sell after the sale is secured. In another embodiment, specific details of two or more particular products are also transmitted to the customer in step 2004 along with an indication that an unspecified one of the particular products will be sold to the customer upon receiving an agreement from the customer. This embodiment also provides the retailer with some flexibility in selecting a product to sell after a sale is secured.

Thereafter, in step 2006, it is determined whether a customer has agreed to purchase a product conforming to the product description for the sale price. The customer can indicate agreement in any known manner, including using the customer device 220 from which the sale price and the product description were presented to the customer. Steps 2008, 2010 and 2012 proceed similarly to steps 1310, 1312 and 1314 of FIG. 13, respectively, and descriptions of these steps are therefore omitted for the sake of brevity.

IV. Airline Ticket Embodiment

Figure 21:
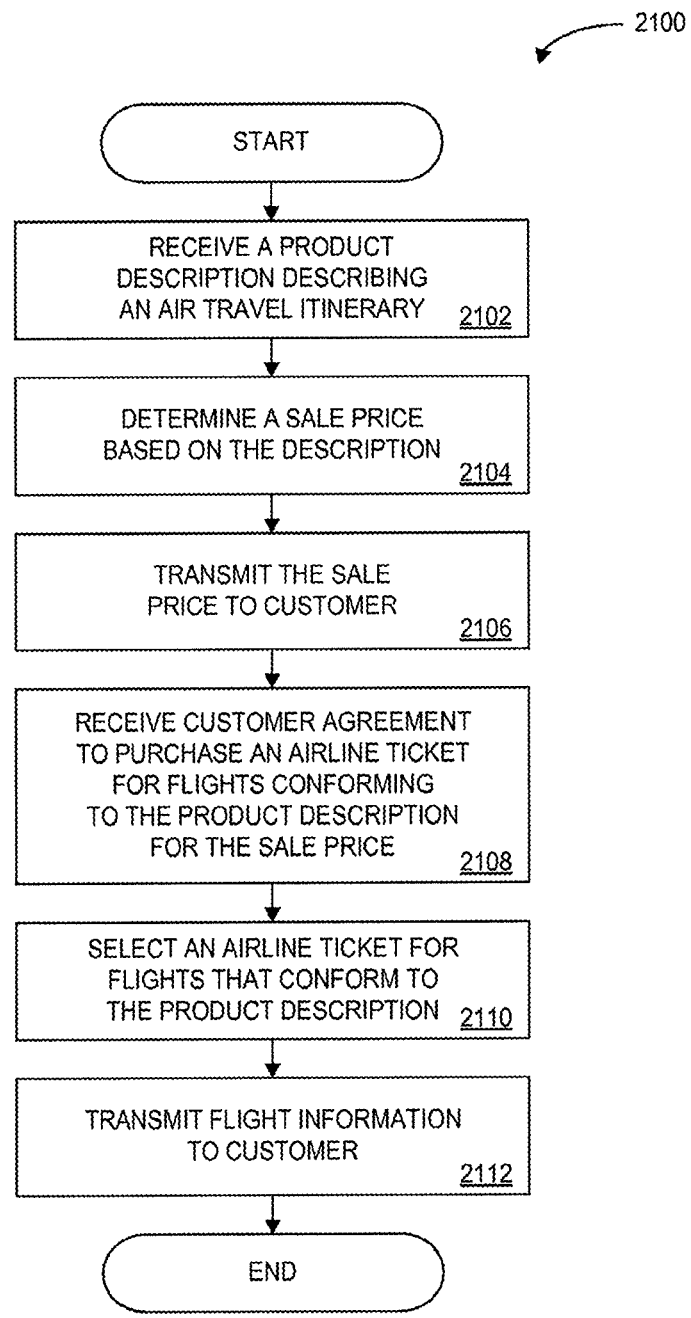
FIG. 21 is a flow diagram illustrating process steps of a transaction for the sale of airline tickets according to one embodiment of the invention.

FIG. 21 illustrates a flow diagram 2100 of process steps to sell an airline ticket according to one embodiment of the present invention. The process steps begin at step 2102, in which a product description describing a desired air travel itinerary is received from a customer. The description may be submitted using any of the methods described with respect to step 1302. The description may include one or more condition values corresponding to the conditions Departure City, Departure Date, Departure Time, Arrival City, Arrival Date, Arrival Time, Airline, Class, or the like. In one embodiment, the condition values are specified in terms of a range, such as a Departure Time condition value of "1:00 pm to 4:00 pm".

In step 2104, the retail system controller 200 determines a sale price corresponding to the product description. The sale price may be determined based on any of the methods discussed with respect to step 1304, or using other methods. The sale price is then transmitted to the customer in step 2106. In one embodiment, also transmitted in step 2106 is an agreement from the retailer to sell, for the sale price, an airline ticket for flights that conform to the product description.

Next, in step 2108, an agreement is received from the customer to purchase an airline ticket for flights conforming to the product description for the sale price. In one embodiment, the controller 200 does not transmit, before an agreement to purchase an airline ticket for the sale price is received, any information to the customer identifying a particular flight on which the purchased airline ticket will allow the customer to travel. The customer is also not guaranteed, before an agreement to purchase an airline ticket for the sale price is received, to what specific flight or flights the airline ticket corresponds. By avoiding transmission of this information, a retailer is provided with flexibility in selecting an airline ticket to sell after the customer is bound to the agreement. However, in another embodiment, specific details of two or more particular flights are transmitted to the customer in step 2108 along with an indication that the airline ticket that will be sold will allow the customer to travel on an unspecified one or more of the particular flights. This embodiment also provides the retailer with some flexibility in selecting a ticket to sell after the customer is bound.

An airline ticket for flights conforming to the product description is selected in step 2110. In one embodiment, the selection of the airline ticket and flights is delayed so as to give the retailer an opportunity to determine what flights will not sell out and to bind the customer to those low-demand flights. After step 2110, the identity of the selected flights is transmitted to the customer in step 2112.

It should be noted that the airline ticket may be selected at any time after the product description is received in step 2102. It should also be noted that the alternative arrangements discussed in sections I. to III. may be incorporated, where appropriate, to the steps of FIG. 21.

Additional Embodiments

The following are several examples that illustrate additional embodiments of the present invention. These examples do not constitute a definition of all possible embodiments, and those skilled in the art will understand that the present invention is applicable to many other embodiments. Further, although the following examples are briefly described for clarity, those skilled in the art will understand how to make any changes, if necessary, to the above-described embodiments to accommodate these and other embodiments and applications.

According to an additional embodiment, a customer-input product description includes condition values weighted or ranked in order of preference. The condition values may be weighted by assignment of a dollar amount to each condition value, or by using "slider" bars of a graphical user interface to indicate an amount of preference. The condition values in such a product description therefore do not reflect absolute requirements of a conforming product, but guidelines for selecting a product. Accordingly, such a product description provides significant flexibility to a retailer in selecting a product to sell. The retailer may be willing to provide a deep discount in exchange for this flexibility.

In another embodiment, the customer is bound to the transaction for a specified period but the retailer is not. Accordingly, once the customer has accepted a sale price/product description, the retailer can choose to sell a conforming product to a customer at any time within the specified period. The retailer may also choose not to sell a product to the customer during the specified period, based on inventory, demand from other buyers, competitors' prices, or other factors. Again, the retailer may be willing to offer a substantial discount in exchange for the flexibility provided by such an arrangement.

As mentioned above, the present invention advantageously allows a retailer to collect data regarding condition values desired by customers. Therefore, in one embodiment, the retailer system controller 200 includes an optimization program that orders or reorders inventory tailored to the collected data. Such a program could, for example, identify the most-commonly desired condition values and order products that conform to those condition values. In identifying the most-commonly desired condition values, the optimization program can give more weight to the condition values of received product descriptions which result in a sale, as opposed to condition values of received product descriptions which do not result in a sale.

The collected data may also be used to determine a perceived value of various condition values. The perceived values may be used in cases where the retailer cannot satisfy a received product condition by replacing unsatisfiable condition values with satisfiable condition values having similar perceived values.

The retail system controller 200 may also include a list of preferred products to sell. In a case that a listed product conforms to a received product description, a retailer may be willing to transmit a discounted sale price. On the other hand, if no listed products conform to the received product description, the retailer may transmit suggested changes to the product description so as to persuade the customer to submit a product description to which a listed product conforms.

In another embodiment, the retail system controller 200 considers the transaction history of a customer from whom a product description/sale price was received during determination of a sale price/product description based on the received description/price. For example, a first-time customer may be presented with a substantial discount or a narrow product description in order to retain the customer. The retail system controller 200 may also consider other customer activities during determination of a sale price/product description. In this regard, a customer may "earn" additional flexibility points, price discounts or a narrower product description by filling out a surveyor by providing additional product descriptions during the sales transaction. For example, a first customer who submits a product description and agrees to complete a survey receives a lower sale price than a second customer who submits an identical product description and does not agree to complete the survey. The lower sale price may be determined by using a more favorable flexibility database 600 and/or product pricing database 700 for the first customer than the second customer. Similarly, a first customer who submits a sale price and agrees to complete a survey receives a narrower product description than a second customer who submits an identical sale price and does not agree to complete the survey. This latter scenario may he implemented by using a more favorable product description database 800 for the first customer.

In responding to reception of a product description from a customer, the retailer may present alternatives that foresee the customer's response. For example, the retailer may present a customer with a low price and a product description which conforms closely, but not exactly, to the received product description, with a high price and a product description having more desirable mutually-inclusive condition values than the received product description, and, with the received product description, a price between the high price and the low price. Such an approach increases a likelihood that an agreement will be reached, and provides the retailer with an opportunity to move undesirable products or to generate greater profit. This approach may also be incorporated into embodiments in which a sale price is received from a customer.

While the present invention has been described above with respect to several embodiments, the scope of the invention is not deemed limited to the above embodiments. Rather, the present invention covers all embodiments falling within the scope and spirit of the following claims as well as equivalent arrangements thereof.

The invention claimed is:

1. An apparatus for redemption processing, the apparatus comprising:
a communication port configured to
receive a redemption identifier from a customer device via a communication network, the redemption identifier including encoded information; and
a processor coupled to the communication port, wherein the apparatus is configured to cause the processor to
automatically decode the encoded information in response to receiving the redemption identifier, wherein decoding the encoded information produces redemption information related to a request to redeem a product or service and an indication of a retailer that received the request to redeem the product or service;
automatically query a redemption database to locate a corresponding record in the redemption database, wherein the corresponding record in the redemption database identifies a location of the retailer and a redemption time at which the retailer received the request to redeem the product or service;
automatically analyze whether the redemption identifier comprises a validated redemption identifier based at least in part on a comparison of a location identified in the redemption information with the location of the retailer identified by the corresponding record in the redemption database, and a comparison of an operative time identified in the redemption information with the redemption time at which the retailer received the request to redeem the product or service, wherein the redemption time is identified by the corresponding record in the redemption database, and
automatically generate an indication of the determined validity, wherein the indication of the determined validity authorizes the retailer that received the request to redeem the product or service to accept the redemption identifier as payment for at least a portion of a purchase price of a product or service in an instance in which the indication of the determined validity indicates that the redemption identifier is valid.

2. The apparatus of claim 1,
wherein the communication port is further configured to receive a product description from a user, wherein the product description comprises one or more of product characteristics, service characteristics, category information or retailer information,
wherein the apparatus is further configured to cause displaying of one or more retailers that have one or more products or services that correspond to the received product description, and
wherein the apparatus is further configured to cause displaying of the one or more retailers with a current price for a redemption identifier embodied in at least one of a voucher, a personal identification code or a frequent shopper card.

3. The apparatus of claim 2, wherein the apparatus is further configured to cause the communication port to transmit redemption information in an instance in which a product or service of the one or more products or services is selected, wherein the redemption information is redeemable towards at least a portion of the purchase price of the product or service.

4. The apparatus of claim 3, wherein the apparatus is further configured to cause the processor to:
generate the current price for the one or more products or services dynamically based at least in part on the received product description and at least one of inventory, demand, sales or subsidies.

5. The apparatus of claim 4, wherein the apparatus is further configured to cause the processor to determine that a current transaction satisfies one or more redemption parameters.

6. The apparatus of claim 1, wherein the apparatus is further configured to cause the processor to:
determine an additional payment amount for the product or service in conjunction with the use of the redemption identifier; and
cause a request for payment to be transmitted.

7. The apparatus of claim 1, wherein the redemption information further comprises an identification of a product or service.

8. The apparatus of claim 1, wherein the redemption identifier is embodied in at least one of a voucher, a personal identification code or a frequent shopper card.

9. A method for redemption processing comprising:
receiving, by a communication port, an indication of a redemption identifier from a customer device via a communication network, the redemption identifier including encoded information;
automatically decoding, by a processor, the encoded information in response to receiving the redemption identifier, wherein decoding the encoded information produces redemption information related to a request to redeem a product or service and an indication of a retailer that received the request to redeem the product or service;
automatically querying, by the processor, a redemption database to locate a corresponding record in the redemption database, wherein the corresponding record in the redemption database identifies a location of the retailer and a redemption time at which the retailer received the request to redeem the product or service;
automatically analyzing, by the processor, whether the redemption identifier comprises a validated redemption identifier based at least in part on a comparison of a location identified in the redemption information with the location of the retailer identified by the corresponding record in the redemption database, and a comparison of an operative time identified in the redemption information with the redemption time at which the retailer received the request to redeem the product or service, wherein the redemption time is identified by the corresponding record in the redemption database; and
automatically generating, by the processor, an indication of the determined validity, wherein the indication of the determined validity authorizes the retailer that received the request to redeem the product or service to accept the redemption identifier as payment for at least a portion of a purchase price of a product or service in an instance in which the indication of the determined validity indicates that the redemption identifier is valid.

10. The method of claim 9, further comprising:
receiving, by the communication port, a product description from a user, wherein the product description comprises one or more of product characteristics, service characteristics, category information or retailer information, and
causing display of one or more retailers that have one or more products or services that correspond to the received product description, wherein causing display of the one or more retailers includes causing display of a current price for a redemption identifier embodied in at least one of a voucher, a personal identification code or a frequent shopper card.

11. The method of claim 10, further comprising:
transmitting, by the communication port, redemption information in an instance in which a product or service of the one or more products or services is selected, wherein the redemption information is redeemable towards at least a portion of the purchase price of the product or service.

12. The method of claim 11, further comprising:
generating, by the processor, the current price for the one or more products or services dynamically based at least in part on the received product description and at least one of inventory, demand, sales or subsidies.

13. The apparatus of claim 12, further comprising:
determining, by the processor, that a current transaction satisfies one or more redemption parameters.

14. The apparatus of claim 9, further comprising:
determining, by the processor, an additional payment amount for the product or service in conjunction with the use of the redemption identifier; and
causing a request for payment to be transmitted.

15. The apparatus of claim 9, wherein the redemption information further comprises an identification of a product or service.

16. The apparatus of claim 9, wherein the redemption identifier is embodied in at least one of a voucher, a personal identification code or a frequent shopper card.

17. An apparatus for redemption processing comprising:
means for receiving an indication of a redemption identifier from a customer device via a communication network, the redemption identifier including encoded information;
means for automatically decoding the encoded information in response to receiving the redemption identifier, wherein decoding the encoded information produces redemption information related to a request to redeem a product or service and an indication of a retailer that received the request to redeem the product or service;
means for automatically querying a redemption database to locate a corresponding record in the redemption database, wherein the corresponding record in the redemption database identifies a location of the retailer and a redemption time at which the retailer received the request to redeem the product or service;
means for automatically analyzing whether the redemption identifier comprises a validated redemption identifier based at least in part on a comparison of a location identified in the redemption information with the location of the retailer identified by the corresponding record in the redemption database, and a comparison of an operative time identified in the redemption information with the redemption time at which the retailer received the request to redeem the product or service, wherein the redemption time is identified by the corresponding record in the redemption database; and
means for automatically generating an indication of the determined validity, wherein the indication of the determined validity authorizes the retailer that received the request to redeem the product or service to accept the redemption identifier as payment for at least a portion of a purchase price of a product or service in an instance in which the indication of the determined validity indicates that the redemption identifier is valid.

18. The apparatus of claim 17, further comprising:
means for receiving a product description from a user, wherein the product description comprises one or more of product characteristics, service characteristics, category information or retailer information;
means for displaying one or more retailers that have one or more products or services that correspond to the received product description, wherein the one or more retailers are displayed with a current price for a redemption identifier embodied in at least one of a voucher, a personal identification code or a frequent shopper card;
means for causing redemption information to be transmitted in an instance in which a product or service of the one or more products or services is selected, wherein the redemption information is redeemable towards at least a portion of the purchase price of the product or service.

19. The apparatus of claim 18, further comprising:
means for generating the current price for the one or more products or services, wherein the current price is dynamically set based at least in part on the received product description and at least one of inventory, demand, sales or subsidies.

20. The apparatus of claim 19, further comprising:
means for determining an additional payment amount for the product or service in conjunction with the use of the redemption identifier; and
means for causing a request for payment to be transmitted.

* * * * *